US012664398B2

(12) United States Patent
Vaghani

(10) Patent No.: US 12,664,398 B2
(45) Date of Patent: Jun. 23, 2026

(54) SYSTEM, METHOD AND NON-TRANSITORY COMPUTER READABLE MEDIUM FOR CONVOLUTIONAL NEURAL NETWORK MODEL OPTIMIZATION TARGETING BLACKBOX HARDWARE

(71) Applicant: NEC Corporation, Tokyo (JP)

(72) Inventor: Darshit Vaghani, Tokyo (JP)

(73) Assignee: NEC CORPORATION, Tokyo (JP)

( * ) Notice: Subject to any disclaimer, the term of this patent is extended or adjusted under 35 U.S.C. 154(b) by 853 days.

(21) Appl. No.: 17/908,025

(22) PCT Filed: Mar. 24, 2020

(86) PCT No.: PCT/JP2020/013041
§ 371 (c)(1),
(2) Date: Aug. 30, 2022

(87) PCT Pub. No.: WO2021/192041
PCT Pub. Date: Sep. 30, 2021

(65) Prior Publication Data
US 2023/0021197 A1      Jan. 19, 2023

(51) Int. Cl.
*G06N 3/02* (2006.01)
*G06N 3/045* (2023.01)
(Continued)

(52) U.S. Cl.
CPC ................. *G06N 3/02* (2013.01); *G06N 5/04* (2013.01)

(58) Field of Classification Search
CPC ............ G06N 3/02; G06N 5/04; G06N 3/045; G06N 3/063; G06N 3/0455
See application file for complete search history.

(56) References Cited

U.S. PATENT DOCUMENTS

2018/0046894 A1   2/2018   Yao
2020/0082247 A1*  3/2020   Wu ......................... G06N 3/045

FOREIGN PATENT DOCUMENTS

JP        2018-195231 A    12/2018
WO    WO-2020050886 A1 *   3/2020   ............. G06F 17/16

OTHER PUBLICATIONS

Plastiras et al., EdgeNet—Balancing Accuracy and Performance for Edge-based Convolutional Neural Network Object Detectors, Nov. 14, 2019, In Proceedings of the 13th International Conference on Distributed Smart Cameras (ICDSC 2019). ACM, New York, NY, USA, Article 8, https://arxiv.org/abs/1911.06091 (Year: 2019).*

(Continued)

*Primary Examiner* — Kakali Chaki
*Assistant Examiner* — Molly C Sippel
(74) *Attorney, Agent, or Firm* — Sughrue Mion, PLLC

(57)        ABSTRACT

An object is to provide a tiling based convolutional NN model optimizing system for blackbox hardware. The system including performing means (11) for changing a size of data and performing a convolutional NN operation included in a first convolutional NN model on the data, managing means (12) for managing the size of data in association with inference time when the convolutional NN operation is performed on the data, determining (13) means for determining a timing at which at least one of a tiling operation and a concatenation operation is performed in the first convolutional NN model based on the inference time, and generating means (14) for generating a second convolutional NN model by adding at least one of the tiling operation and the concatenation operation at the determined timing.

6 Claims, 24 Drawing Sheets

100

(51) Int. Cl.

| | |
|---|---|
| *G06N 3/0455* | (2023.01) |
| *G06N 3/0464* | (2023.01) |
| *G06N 3/063* | (2023.01) |
| *G06N 5/04* | (2023.01) |

(56) References Cited

OTHER PUBLICATIONS

S. Alfasly, B. Liu, Y. Hu, Y. Wang and C.-T. Li, "Auto-Zooming CNN-Based Framework for Real-Time Pedestrian Detection in Outdoor Surveillance Videos," in IEEE Access, vol. 7, pp. 105816-105826, 2019, doi: 10.1109/Access.2019.2931915. (Year: 2019).*

Chun C, Ryu S-K. Road Surface Damage Detection Using Fully Convolutional Neural Networks and Semi-Supervised Learning. Sensors. 2019; 19(24):5501. https://doi.org/10.3390/s19245501 (Year: 2019).*

International Search Report for PCT Application No. PCT/JP2020/013041, mailed on Sep. 8, 2020.

Kaiyuan Guo et al., "Angel-Eye: A Complete Design Flow for Mapping CNN Onto Embedded FPGA", IEEE Transactions on Computer-Aided Design of Integrated Circuits and Systems, vol. 37, No. 1, Jan. 2018, pp. 35-47.

Nadav Rotem et al., "Glow: Graph Lowering Compiler Techniques for Neural Networks", Computing Research Repository, arxiv.org, 2018, pp. 1-10.

Xuechao Wei et al., "TGPA: Tile-Grained Pipeline Architecture for Low Latency CNN Inference", ICCAD '18, Nov. 5-8, 2018, San Diego, CA, USA, pp. 1-8.

Saining Xie et al., "Aggregated Residual Transformations for Deep Neural Networks", pp. 1-10, arXiv, Apr. 11, 2017, Retrieved from the Internet: <URL:https://arxiv.org/pdf/1611.05431v2.pdf>.

Andrew Howard et al., "Searching for MobileNetV3", Nov. 20, 2019, pp. 1-11, Retrieved from the Internet:<URL:https://arxiv.org/pdf/1905.02244v5.pdf>.

* cited by examiner

| C101 | C102 | C103 | C104 | C105 | C106 | C107 | C108 |
|---|---|---|---|---|---|---|---|
| Layer no. | Operation | Input Height | Input Width | Input Channel | Output Height | Output Width | Output Channel |
| 1 | Convolution | 1980 | 1080 | 3 | 990 | 540 | 16 |
| 2 | Convolution | 990 | 540 | 16 | 495 | 270 | 32 |
| 3 | Pooling | 495 | 270 | 32 | 248 | 135 | 32 |
| . | . | . | . | . | . | . | . |
| . | . | . | . | . | . | . | . |
| N-2 | Fully_Connected | 1 | 1 | 4000 | 1 | 1 | 1000 |
| N-1 | Fully_Connected | 1 | 1 | 1000 | 1 | 1 | 100 |
| N | Softmax | 1 | 1 | 100 | 1 | 1 | 100 |

FIG. 6

| Layer no. | Operation | Input Height | Input Width | Input Channel | Output Height | Output Width | Output Channel |
|---|---|---|---|---|---|---|---|
| 1 | Convolution | 1980 | 1080 | 3 | 990 | 540 | 16 |
| 2 | Convolution | 990 | 540 | 16 | 495 | 270 | 32 |
| 3 | Pooling | 495 | 270 | 32 | 248 | 135 | 32 |
| . | . | . | . | . | . | . | . |
| . | . | . | . | . | . | . | . |
| N-1 | Upsampling | 495 | 270 | 16 | 990 | 540 | 16 |
| N | Deconvolution | 990 | 540 | 16 | 1980 | 1080 | 3 |

| C101 | C102 | C103 | C104 | C105 | C106 | C107 | C108 |
|---|---|---|---|---|---|---|---|
| Layer no. | Operation | Input Height | Input Width | Input Channel | Output Height | Output Width | Output Channel |
| 1 | Tiling | 1980 | 1080 | 3 | 990 | 540 | 3 |
| | | | | | 990 | 540 | 3 |
| | | | | | 990 | 540 | 3 |
| | | | | | 990 | 540 | 3 |
| | Convolution | 990 | 540 | 3 | 495 | 270 | 16 |
| | Convolution | 990 | 540 | 3 | 495 | 270 | 16 |
| | Convolution | 990 | 540 | 3 | 495 | 270 | 16 |
| | Convolution | 990 | 540 | 3 | 495 | 270 | 16 |
| 2 | Convolution | 495 | 270 | 16 | 495 | 270 | 32 |
| | Convolution | 495 | 270 | 16 | 495 | 270 | 32 |
| | Convolution | 495 | 270 | 16 | 495 | 270 | 32 |
| | Convolution | 495 | 270 | 16 | 495 | 270 | 32 |
| | Concat | 495 | 270 | 32 | 990 | 540 | 32 |
| | | 495 | 270 | 32 | | | |
| | | 495 | 270 | 32 | | | |
| | | 495 | 270 | 32 | | | |
| 3 | Pooling | 990 | 540 | 32 | 495 | 270 | 32 |
| . | . | . | . | . | . | . | . |
| . | . | . | . | . | . | . | . |
| N-1 | Full_connected | 1 | 1 | 4000 | 1 | 1 | 1000 |
| N | Softmax | 1 | 1 | 1000 | 1 | 1 | 100 |

| Layer no. | Operation | Input Height | Input Width | Input Channel | Output Height | Output Width | Output Channel |
|---|---|---|---|---|---|---|---|
| C101 | C102 | C103 | C104 | C105 | C106 | C107 | C108 |
| . | . | . | . | . | | . | . |
| . | . | . | . | . | | . | . |
| N-1 | Upsampling | 248 | 135 | 16 | 495 | 270 | 8 |
| | Upsampling | 248 | 135 | 16 | 495 | 270 | 8 |
| | Upsampling | 248 | 135 | 16 | 495 | 270 | 8 |
| | Upsampling | 248 | 135 | 16 | 495 | 270 | 8 |
| N | Tiling | 495 | 270 | 8 | 248 | 135 | 16 |
| | | | | | ... | ... | 16 |
| | Deconvolution | 248 | 135 | 16 | 495 | 270 | 3 |
| | ... | ... | ... | ... | ... | ... | ... |
| | Deconvolution | 248 | 135 | 16 | 495 | 270 | 3 |

FIG. 11

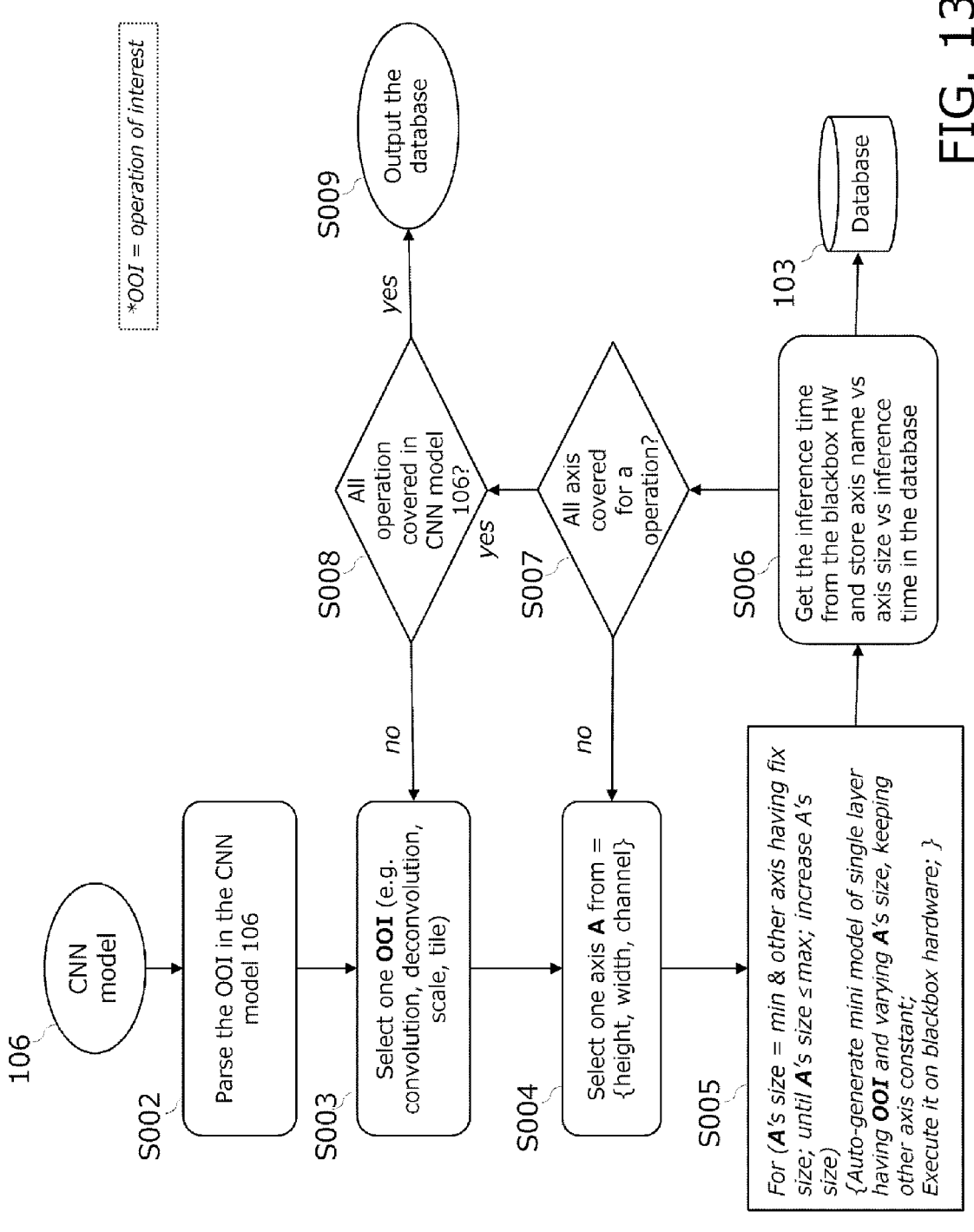

*OOI = operation of interest

106 — CNN model

S002 — Parse the OOI in the CNN model 106

S003 — Select one OOI (e.g. convolution, deconvolution, scale, tile)

S004 — Select one axis A from = {height, width, channel}

S005 — *For (A's size = min & other axis having fix size; until A's size ≤ max; increase A's size)*
*{Auto-generate mini model of single layer having OOI and varying A's size, keeping other axis constant;*
*Execute it on blackbox hardware; }*

S006 — Get the inference time from the blackbox HW and store axis name vs axis size vs inference time in the database S007 — All axis covered for a operation?

S008 — All operation covered in CNN model 106?

S009 — Output the database

103 — Database no (S007 → S004)

no (S008 → S003)

yes (S007 → S008)

yes (S008 → S009)

FIG. 13

| OOI | Axis | Axis_size | Inference time (seconds) |
|---|---|---|---|
| C201 | C202 | C203 | C204 |
| Convolution | Height | 10 | #value |
| Convolution | Height | 11 | #value |
| . . . | . . . | . . . | . . . |
| Convolution | Height | 1980 | #value |
| Convolution | Width | 10 | #value |
| Convolution | Width | 11 | #value |
| . . . | . . . | . . . | . . . |
| Convolution | Width | 1080 | #value |
| Convolution | Channel | 1 | #value |
| Convolution | Channel | 2 | #value |
| . . . | . . . | . . . | . . . |
| Convolution | Channel | 16 | #value |
| Pooling | Height | 10 | #value |
| . . . | . . . | . . . | . . . |

FIG. 14

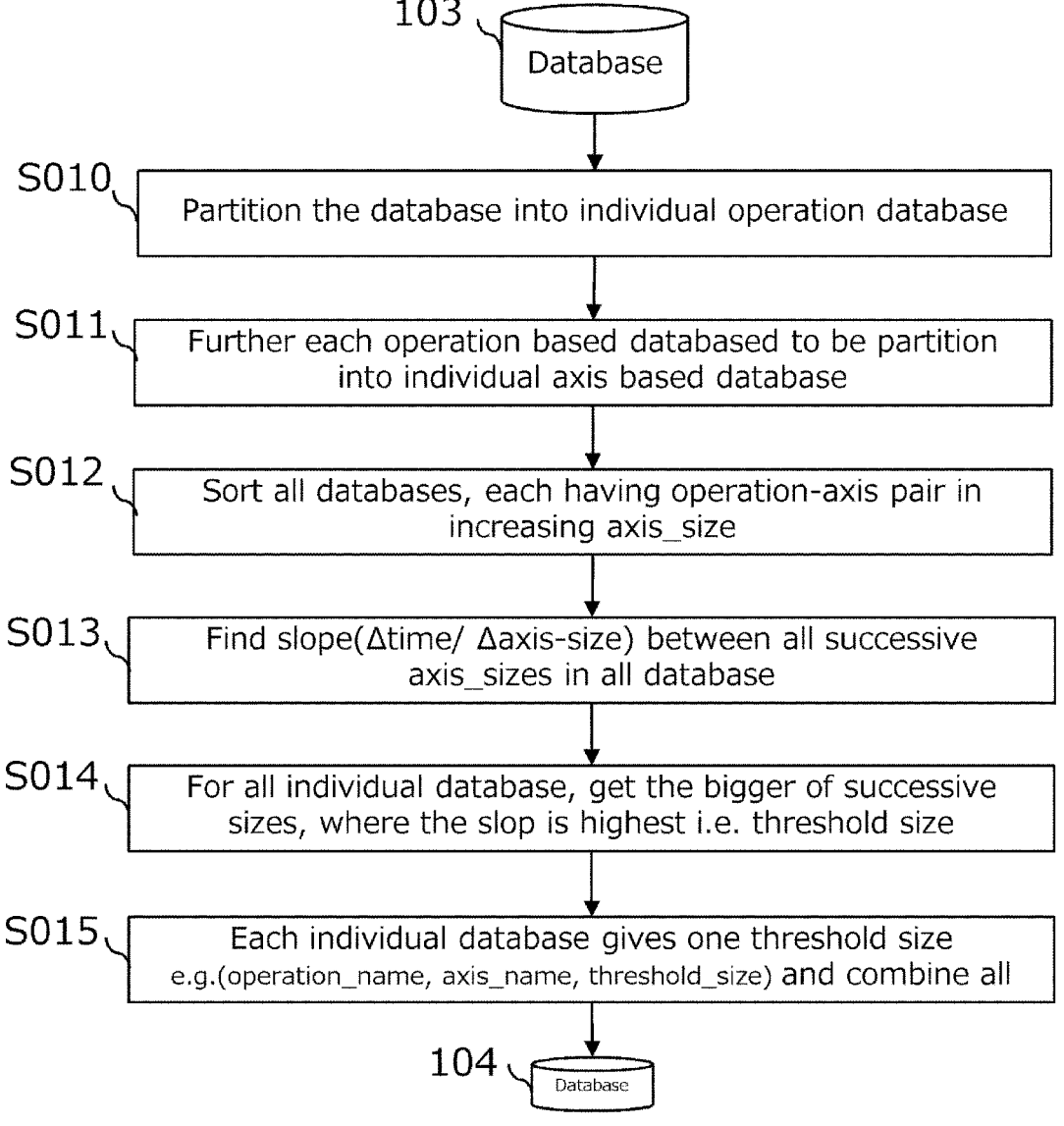

103

Database

S010 — Partition the database into individual operation database

S011 — Further each operation based databased to be partition into individual axis based database S012 — Sort all databases, each having operation-axis pair in increasing axis_size S013 — Find slope(Δtime/ Δaxis-size) between all successive axis_sizes in all database S014 — For all individual database, get the bigger of successive sizes, where the slop is highest i.e. threshold size S015 — Each individual database gives one threshold size e.g.(operation_name, axis_name, threshold_size) and combine all

104

Database

| OOI | Attributes | Threshold size |
|---|---|---|
| Convolution | Height | 992 |
| Convolution | Width | 542 |
| Convolution | Channel | 8 |
| Deconvolution | Height | 249 |
| ⋮ | ⋮ | ⋮ |

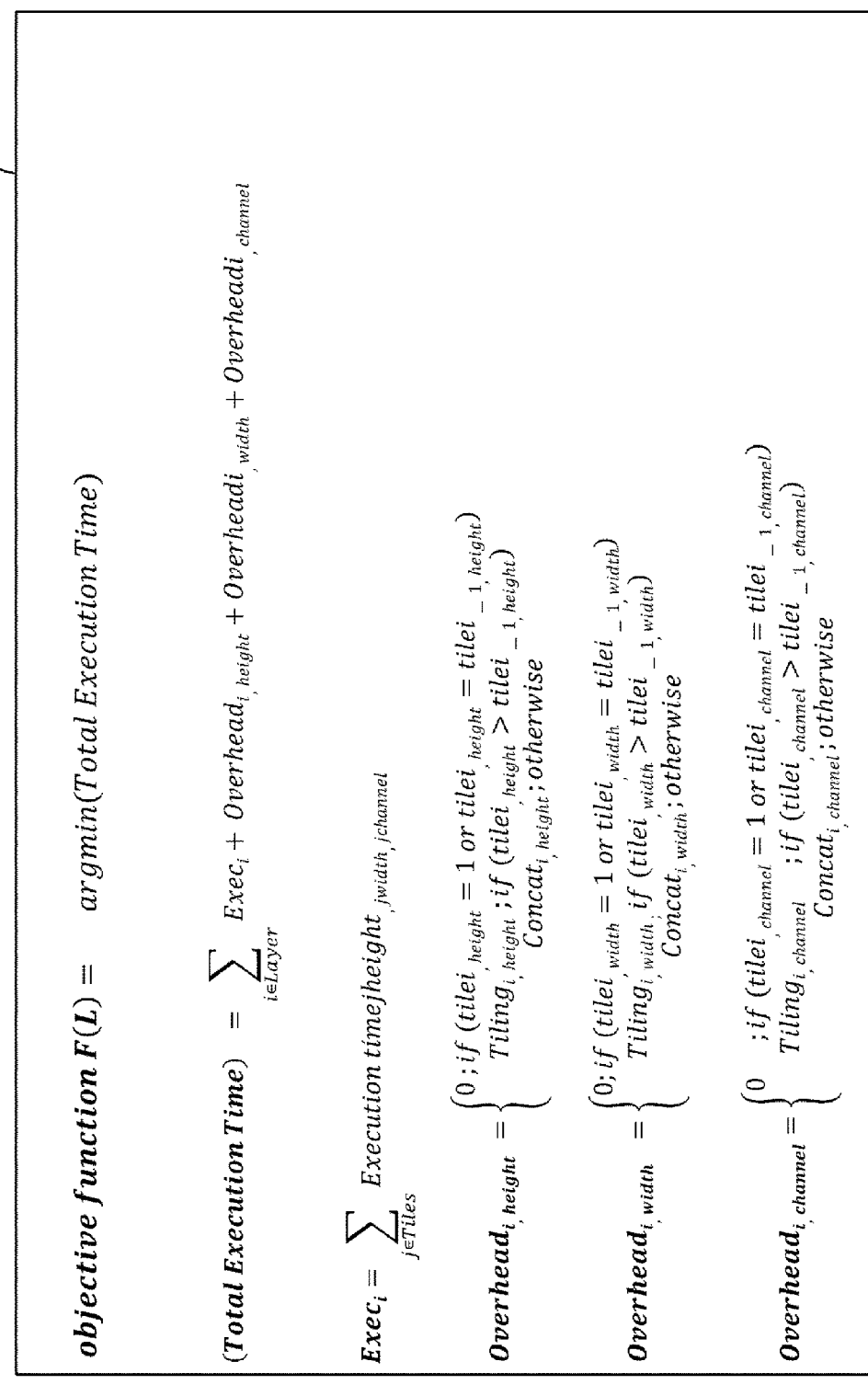

$$objective\ function\ F(L) = argmin(Total\ Execution\ Time)$$

$$(Total\ Execution\ Time) = \sum_{i\in Layer} Exec_i + Overhead_{i,height} + Overhead_{i,width} + Overhead_{i,channel}$$

$$Exec_i = \sum_{j\in Tiles} Execution\ time j height_{j,width,j channel}$$

$$Overhead_{i,height} = \begin{cases} 0\ ;if\ (tilei_{,height} = 1\ or\ tilei_{,height} = tilei_{-1,height}) \\ Tiling_{i,height}\ ;if\ (tilei_{,height} > tilei_{-1,height}) \\ Concat_{i,height}\ ;otherwise \end{cases}$$

$$Overhead_{i,width} = \begin{cases} 0\ ;if\ (tilei_{,width} = 1\ or\ tilei_{,width} = tilei_{-1,width}) \\ Tiling_{i,width}\ ;if\ (tilei_{,width} > tilei_{-1,width}) \\ Concat_{i,width}\ ;otherwise \end{cases}$$

$$Overhead_{i,channel} = \begin{cases} 0\ ;if\ (tilei_{,channel} = 1\ or\ tilei_{,channel} = tilei_{-1,channel}) \\ Tiling_{i,channel}\ ;if\ (tilei_{,channel} > tilei_{-1,channel}) \\ Concat_{i,channel}\ ;otherwise \end{cases}$$

FIG. 18

| Layer no. | Operation | Size | | | | Threshold size | | | | #tile$_{i,height}$ | #tile$_{i,width}$ | #tile$_{i,channel}$ |
| --- | --- | --- | --- | --- | --- | --- | --- | --- | --- | --- | --- | --- |
| | | Input Height | Input Width | Input Channel | | Input Height | Input Width | Input Channel | | | | |
| 1 | Convolution | 1980 | 1080 | 3 | | 992 | 542 | 8 | | 2 | 2 | 1 |
| 2 | Convolution | 990 | 540 | 16 | | 992 | 542 | 8 | | 1 | 1 | 2 |
| . | . | . | . | . | | . | . | . | | . | . | . |
| . | . | . | . | . | | . | . | . | | . | . | . |
| N | Softmax | 1 | 1 | 100 | | - | - | - | | 1 | 1 | 1 |

FIG. 20

| Layer no. | Operation | Size | | | Threshold size | | | $\#\text{tile}_{i,height}$ | $\#\text{tile}_{i,width}$ | $\#\text{tile}_{i,channel}$ |
| | | Input Height | Input Width | Input Channel | Input Height | Input Width | Input Channel | | | |
|---|---|---|---|---|---|---|---|---|---|---|
| 1 | Convolution | 1980 | 1080 | 3 | 992 | 542 | 8 | 2 | 2 | 1 |
| 2 | Convolution | 990 | 540 | 16 | 992 | 542 | 8 | 1 | 1 | 2 |
| · | · | · | · | · | · | · | · | · | · | · |
| · | · | · | · | · | · | · | · | · | · | · |
| N | Deconvolution | 990 | 540 | 8 | 249 | 137 | 8 | 4 | 4 | 1 |

FIG. 21

$$tile_{height} = \{1, 2, 4, 5, 7 \ ...\}$$
$$tile_{width} = \{1, 2, 3, 4, 5, 6 \ ...\}$$
$$tile_{channel} = \{1, 2, 3, 7 \ ...\}$$

| Axis | Axis_size | #tile | Execution time (seconds) |
|---|---|---|---|
| Height | 1980 | 1 | #value |
| Height | 1980 | 2 | #value |
| Height | 1980 | 4 | #value |
| . . | | | . . |
| Height | 990 | 1 | #value |
| . . . | | | . . . |
| Width | 1080 | 1 | #value |
| Width | 1080 | 2 | #value |
| Width | 1080 | 3 | #value |
| . . | | | . . |
| Width | 540 | 1 | #value |
| . . . | | | . . . |
| Channel | 3 | 1 | #value |
| . . . | | | . . . |

SYSTEM, METHOD AND NON-TRANSITORY COMPUTER READABLE MEDIUM FOR CONVOLUTIONAL NEURAL NETWORK MODEL OPTIMIZATION TARGETING BLACKBOX HARDWARE

This application is a National Stage Entry of PCT/JP2020/013041 filed on Mar. 24, 2020, the contents of all of which are incorporated herein by reference, in their entirety.

TECHNICAL FIELD

The present invention relates to a tiling based convolutional NN model optimizing system targeting blackbox hardware, and, in particular, to a proposed system, capable of improving performance and decreasing the execution time also known as inference time of the convolutional NN models on blackbox hardware with zero accuracy degradation.

BACKGROUND ART

An example of a convolutional NN (neural network) on EDGE device(s) system is described in Non Patent Literature 1. The Angel Eye system proposed in Non Patent Literature 1 targets efficient execution of a convolutional NN, which includes a compiler that performs the tiling based optimization on the convolutional NN. The Non Patent Literature 1 has limitations that its proposal completely relies on the hardware information such as an internal input, an output and a weight buffer size to perform the tiling operation. However, in the rapidly growing EDGE technology, the EDGE devices are generally marketed as blackbox to customers. The key reason is that hardware vendors are reluctant to disclose the hardware internal information. Another example of the efficient execution of the convolutional NN on the EDGE device(s) system is described in Non Patent Literature 2. In the Non Patent Literature 2, the tiling based optimization is proposed. However, the Non Patent Literature 2 has similar limitations that its proposal relies on the internal hardware information such as the $1^{st}$ level cache size of the target hardware. Hence, the Non Patent Literature 2 faces the same issue as the Non Patent Literature 1. Another example of the efficient execution of a convolutional NN on the EDGE device(s) system is described in Non Patent Literature 3. The Non Patent Literature 3 targets only FPGA based hardware and performs the tiling based optimization. In the FPGA, reconfiguring the computing resource is feasible. Taking benefit of such feasibility and information of the reconfigured resource, the Non Patent Literature 3 shows the tiling based optimization. However, such flexibility of reconfiguration and internal commuting resource information are not available in all the EDGE devices because the hardware vendors are reluctant to disclose the hardware internal information. Further, another example of the efficient execution of a convolutional NN on the EDGE device(s) system is described in Patent Literature 1. The Patent Literature 1 performs the tiling based optimization using the internal hardware information such as the number of processing units, the number of convolvers in the processing units, and the size of the each convolver. However, the Patent Literature 1 has similar limitations to those of the Non Patent Literature 1 i.e. non-disclosing of the internal information of the hardware by the vendors.

CITATION LIST

Patent Literature

[Patent Literature 1] US Patent Application Publication No. US2018/0046894

Non Patent Literature

[Non-Patent Literature 1] "Angel-Eye: A Complete Design Flow for Mapping CNN Onto Embedded FPGA"—Kaiyuan Guo, Lingzhi Sui, Jiantao Qiu, Jincheng Yu, Junbin Wang, Song Yao, Song Han, Yu Wang, and Huazhong Yang, IEEE TRANSACTIONS ON COMPUTER-AIDED DESIGN OF INTEGRATED CIRCUITS AND SYSTEMS, VOL. 37, NO. 1, January 2018

[Non-Patent Literature 2] "Glow: Graph Lowering Compiler Techniques for Neural Networks"—Nadav Rotem, Jordan Fix, Saleem Abdulrasool, Garret Catron, Summer Deng, Roman Dzhabarov, Nick Gibson, James Hegeman, Meghan Lele, Roman Levenstein, Jack Montgomery, Bert Maher, Satish Nadathur, Jakob Olesen, Jongsoo Park, Artem Rakhov, Misha Smelyanskiy, Man Wang, Computing Research Repository, arxiv.org, 2018.

[Non-Patent Literature 3] "TGPA: Tile-Grained Pipeline Architecture for Low Latency CNN Inference"—Xuechao Wei, Yun Liang, Xiuhong Li, Cody Hao Yu, Peng Zhang and Jason Cong, ICCAD '18, Nov. 5-8, 2018, San Diego, CA, USA

SUMMARY OF INVENTION

Technical Problem

A first problem is that modern convolutional NN models have several layers that are bigger in size and are not efficiently executed on resource constrained hardware. The big layer means a layer having large height or/and a large width or/and a large channel size.

The reason for the cause of the first problem is resource constraints such as limited processing units (PEs), memory sizes, bandwidths etc. in EDGE device(s) system. As an additional software limitation, inefficient model optimizing compilers do not generate a highly optimized convolutional NN model to be executed on the EDGE device(s) system.

The primary objective of the present invention is to provide a tiling based convolutional NN model optimizing system for blackbox hardware. Also, the system is capable of solving the problem of inefficient execution of the big layers by performing efficient tiling based optimization on big layers.

Solution to Problem

In a first example aspect, a system includes performing means for changing a size of data and performing a convolutional NN operation included in a first convolutional NN model on the data, managing means for managing the size of data in association with inference time when the convolutional NN operation is performed on the data, determining means for determining a timing at which at least one of a tiling operation and a concatenation operation is performed in the first convolutional NN model based on the inference time, and generating means for generating a second convolutional NN model by adding at least one of the tiling operation and the concatenation operation at the determined timing.

In a second example aspect, a method includes changing a size of data and performing a convolutional NN operation included in a first convolutional NN model on the data, managing the size of data in association with inference time when the convolutional NN operation is performed on the data, determining a timing at which at least one of a tiling operation and a concatenation operation is performed in the first convolutional NN model based on the inference time, and generating a second convolutional NN model by adding at least one of the tiling operation and the concatenation operation at the determined timing.

In a third example aspect, a non-transitory computer readable medium storing a program for causing a computer to execute changing a size of data and performing a convolutional NN operation included in a first convolutional NN model on the data, managing the size of data in association with inference time when the convolutional NN operation is performed on the data, determining a timing at which at least one of a tiling operation and a concatenation operation is performed in the first convolutional NN model based on the inference time, and generating a second convolutional NN model by adding at least one of the tiling operation and the concatenation operation at the determined timing.

Advantageous Effects of Invention

An effect is to ensure that big layers are efficiently tiled such that they are effectively executed even on the blackbox hardware.

BRIEF DESCRIPTION OF DRAWINGS

FIG. 4 is a figure showing architecture of a simple convolutional NN model 106a;

FIG. 6 is tabular representation of the simple convolutional NN model 106a containing various operational layers along with respective layer dimensions;

FIG. 7 is tabular representation of the simple convolutional autoencoder NN model 106b containing various operational layers along with respective layer dimensions;

FIG. 8 is a figure showing the modified simple convolutional NN model 106a;

FIG. 9 is the tabular representation of the modified simple convolutional NN model 106a;

FIG. 11 is the tabular representation of the modified convolutional autoencoder NN model 106b;

FIG. 13 is a flowchart showing the sequence of operations performed by the blackbox hardware characterizer unit 101;

FIG. 14 is a figure showing an example of the characterization database 103 generated by the blackbox hardware characterizer unit 101;

FIG. 15 is a flowchart showing the sequence of operations performed by the threshold size extractor unit 109;

FIG. 16 is a figure showing an example of the threshold size database 104 generated by threshold size extractor unit 109;

FIG. 18 is a figure showing the optimization equation to achieve the minimum total execution time by optimizing the range of layers, where the tiling operation and concatenation operation is introduced, solved by the function optimizer unit 110;

FIG. 20 is an example of the $tile_{height}$ list, $tile_{width}$ list and $tile_{channel}$ list for a simple convolutional NN model 106a;

FIG. 21 is an example of the $tile_{height}$ list, $tile_{width}$ list and $tile_{channel}$ list for a convolutional autoencoder NN model 106b;

FIG. 22 is an example of the all the values in the $tile_{height}$ list, $tile_{width}$ list and $tile_{channel}$ list created by the Functional optimizer unit 110.

FIG. 23 is tabular representation of the Tiling execution time; database 117 and the Concatenation execution time database 118;

DESCRIPTION OF EMBODIMENTS

First Embodiment

Figure 24:
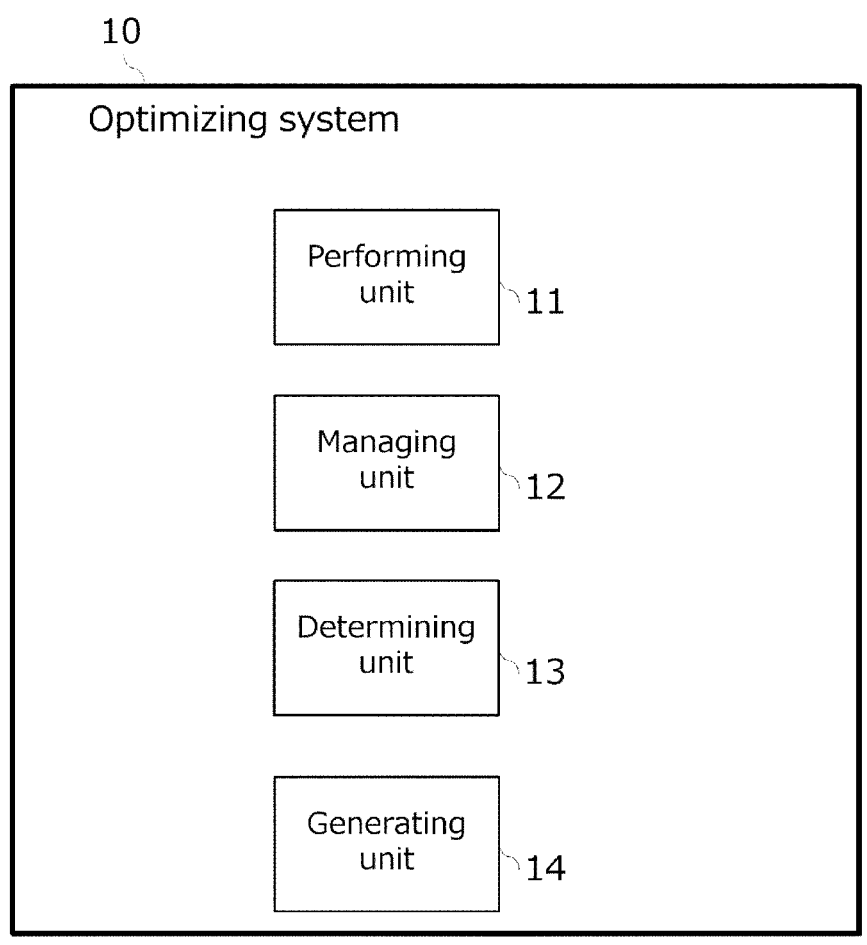
FIG. 24 is a block diagram of an optimizing system.

Example embodiments according to the present invention are described in detail below referring to the accompanying drawings. A configuration example of an optimizing system 10 according to a first example embodiment of the present disclosure is described with reference to FIG. 24. The optimizing system 10 includes a performing unit 11, a managing unit 12, a determining unit 13, and a generating unit 14.

The optimizing system 10 may be configured as a computer device 20. The computer device 20 operates when a processor executes a program stored in a memory. The computer device 20 may include the performing unit 11, the managing unit 12, the determining unit 13, and the generating unit 14.

The performing unit 11, the managing unit 12, the determining unit 13, and the generating unit 14 may be software or a module whose processing is performed when a processor executes a program stored in a memory. Alternatively, the performing unit 11, the managing unit 12, the determining unit 13, and the generating unit 14 may be hardware such as a circuit or a chip.

Alternatively, the optimizing system may be configured as multiple computer devices. For example, the managing unit 12, the determining unit 13, and the generating unit 14 may be configured as the computer device 20 and the performing unit 11 may be configured as another computer device 21.

The performing unit 11 is configured to change the size of data and perform a convolutional NN operation included in a first convolutional NN model on the data. The managing unit 12 is configured to manage the size of data in association with inference time when the convolutional NN operation is performed on the data. The determining unit 13 is configured to determine a timing at which at least one of a tiling operation and a concatenation operation is performed in the first convolutional NN model based on the inference time. The generating unit 14 is configured to generate a second convolutional NN model by adding at least one of the tiling operation and the concatenation operation at the determined timing.

Second Embodiment

Figure 1:
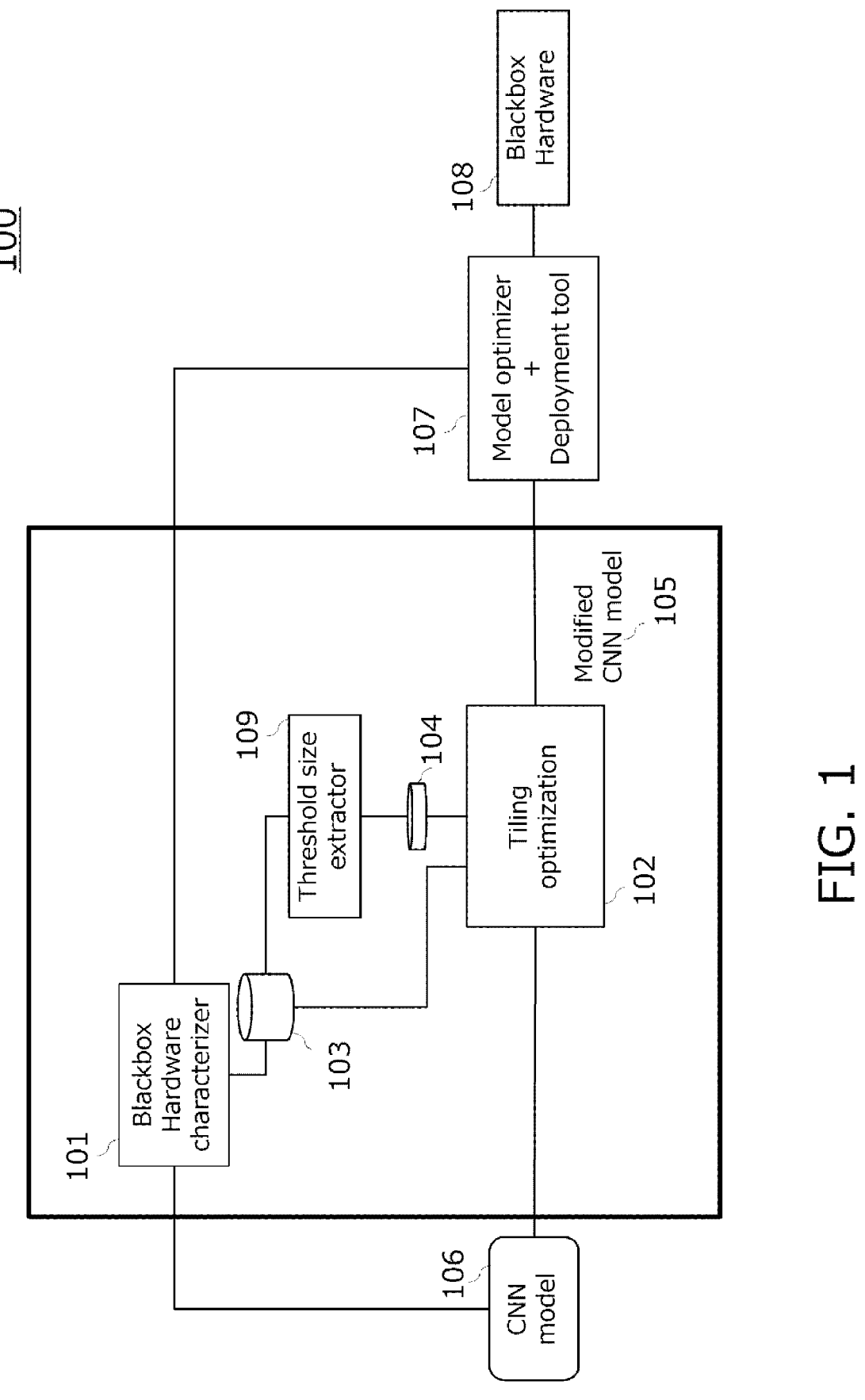
FIG. 1 is a figure of a Tiling based convolutional NN model optimizing system 100 for blackbox hardware 108.

The block diagram of an embodiment system 100 that performs tiling based convolutional NN model optimization is shown in FIG. 1. The embodiment system 100 takes a convolutional NN model 106 as an input and outputs a modified convolutional NN model 105. The modified convolutional NN model 105, compared to the input convolutional NN model 106, has improved performance and reduced inference time with zero accuracy degradation on a blackbox hardware unit 108.

The embodiment system 100 comprises a Blackbox hardware characterizer unit 101, a Threshold size extractor unit 109, a Tiling optimization unit 102, a Model optimizer+ Deployment tool unit 107 and a Blackbox Hardware unit 108.

The Model optimizer+Deployment tool unit 107 corresponds to the performing unit 11 in FIG. 1. The Blackbox hardware characterizer unit 101 corresponds to the managing unit 12 in FIG. 1. The Tiling optimization unit 102 corresponds to the determining unit 13 and the generating unit 14.

The Blackbox Hardware unit 108 may be a computer device that operates when a processor executes a program stored in a memory.

The Blackbox hardware characterizer unit 101, the Threshold size extractor unit 109, the Tiling optimization unit 102, and the Model optimizer+Deployment tool unit 107 may be software or a module whose processing is performed when a processor executes a program stored in a memory. Alternatively, the Blackbox hardware characterizer unit 101, the Threshold size extractor unit 109, the Tiling optimization unit 102, and the Model optimizer+Deployment tool unit 107 may be hardware such as a circuit or a chip.

The blackbox hardware characterizer unit 101 performs the tasks of characterizing the target blackbox hardware unit 108 for all the convolutional NN operations in the input convolutional NN model 106. The threshold size extractor unit 109 performs the tasks of analyzing the characterization results 103 and generating the threshold sizes 104. The function of the tiling optimization unit 102 is to modify the input convolutional NN model 106 by introducing a tiling operation and a concatenation operation at various layers in the input convolutional NN model 106. Then, the Tiling optimization unit 102 generates the modified convolutional NN model 105. The Model optimizer+deployment tool unit 107 performs the compilation of the modified convolutional NN model 105 and deploys the compiled model on the blackbox hardware unit 108. The Model optimizer+deployment tool unit 107 is generally supplied along with the blackbox hardware unit 108 by respective vendors. The blackbox hardware unit 108 performs the tasks of executing the deployed convolutional NN model.

Figure 2:
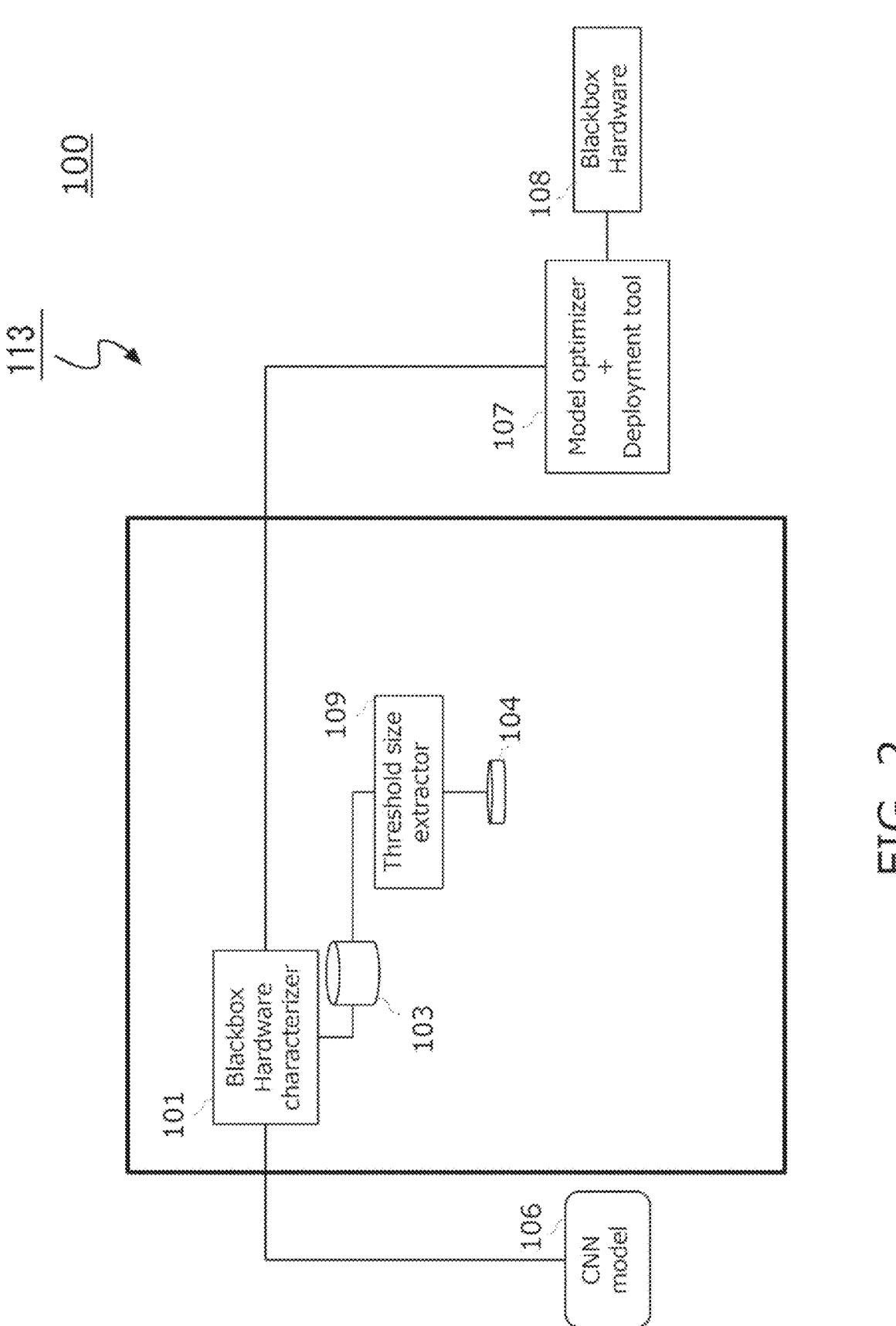
FIG. 2 is a figure showing the characterization mode, wherein the blackbox hardware characterizer unit 101 and the threshold size extractor unit 109 jointly extract the threshold size for the given blackbox hardware unit 108.
Figure 3:
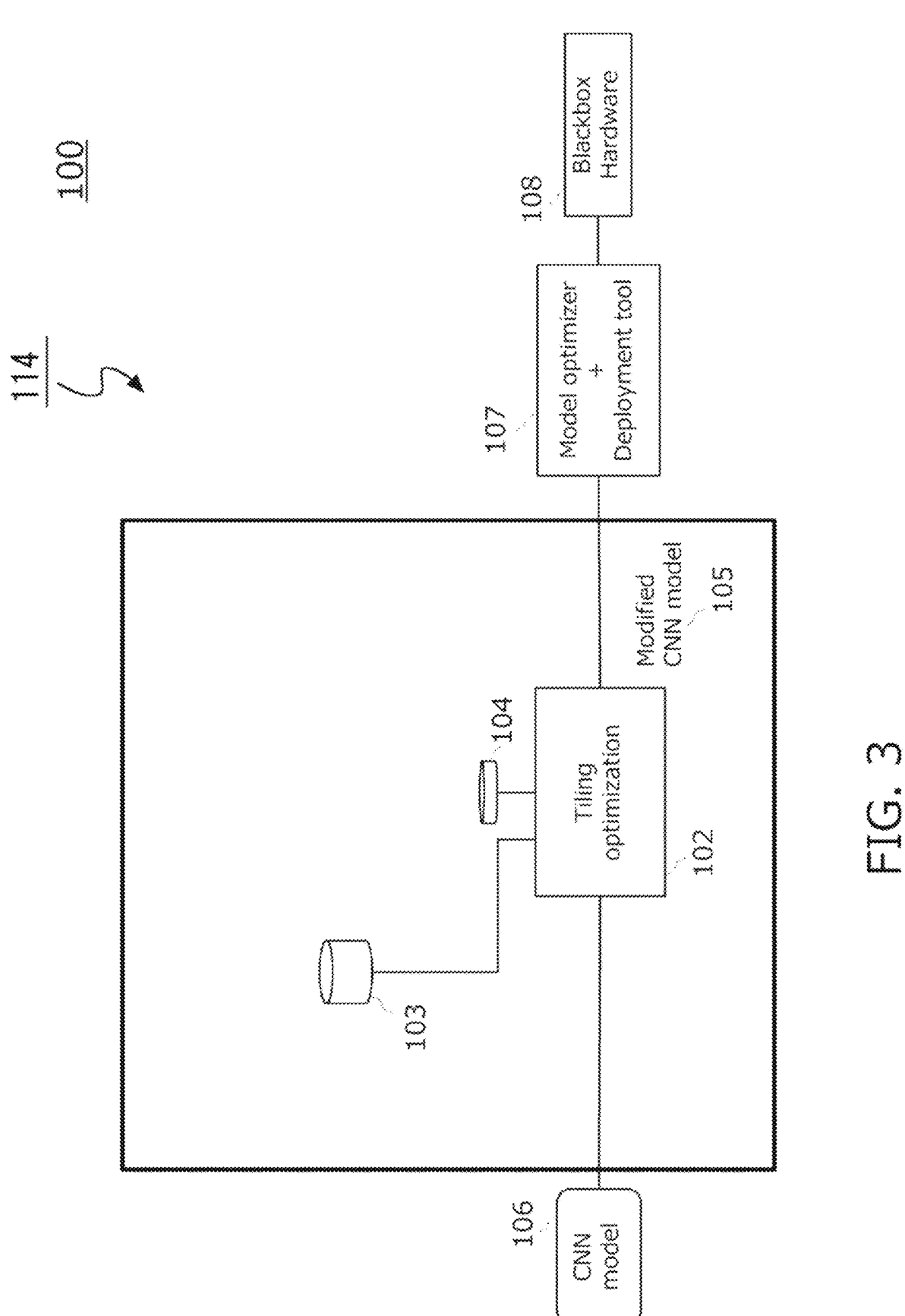
FIG. 3 is a figure showing the model modification mode, wherein the modified convolutional NN model 105 is generated using the threshold size and then deployed on the blackbox hardware unit 108.

The embodiment system 100 operates in two modes. FIG. 2 shows a characterization mode 113 and FIG. 3 shows a model modification mode 114. The characterization mode 113 takes the convolutional NN model 106 as an input and generates two databases. The two data bases include a characterization database 103 and a threshold size database 104. In the characterization mode 113, the blackbox hardware characterizer unit 101, the threshold size extractor unit 109, the model optimizer+deployment tool unit 107 and the blackbox hardware unit 108 operate. In the model modification mode 114, the tiling optimization unit 102 takes data from the characterization database 103 and the threshold size database 104 and the convolutional NN model 106 as the input. The model modification mode 114 generates the modified convolutional NN model 105. The model optimizer+deployment tool unit 107 performs the compilation of the modified convolutional NN model 105 and deploys the compiled model on the blackbox hardware unit 108. In the model modification mode 114, the tiling optimization unit 102, the model optimizer+deployment tool unit 107 and the blackbox hardware unit 108 operate. The characterization mode 113 is executed only once. However, if the target blackbox hardware unit 108 changes, then the characterization mode 113 is re-executed. Further, if some or all convolutional NN model 106's operation layers change, then the characterization mode 113 is re-executed likewise.

Figure 4:
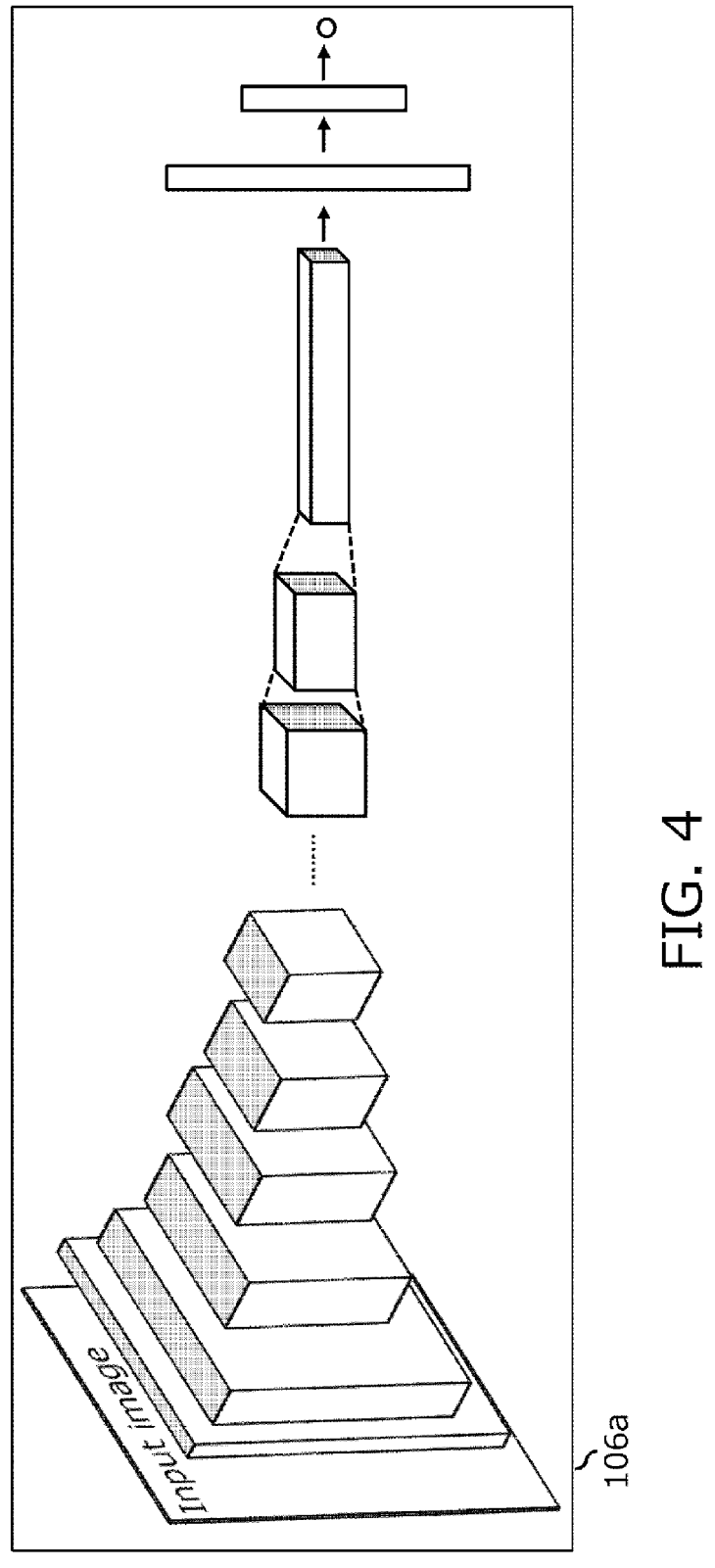
Figure 5:
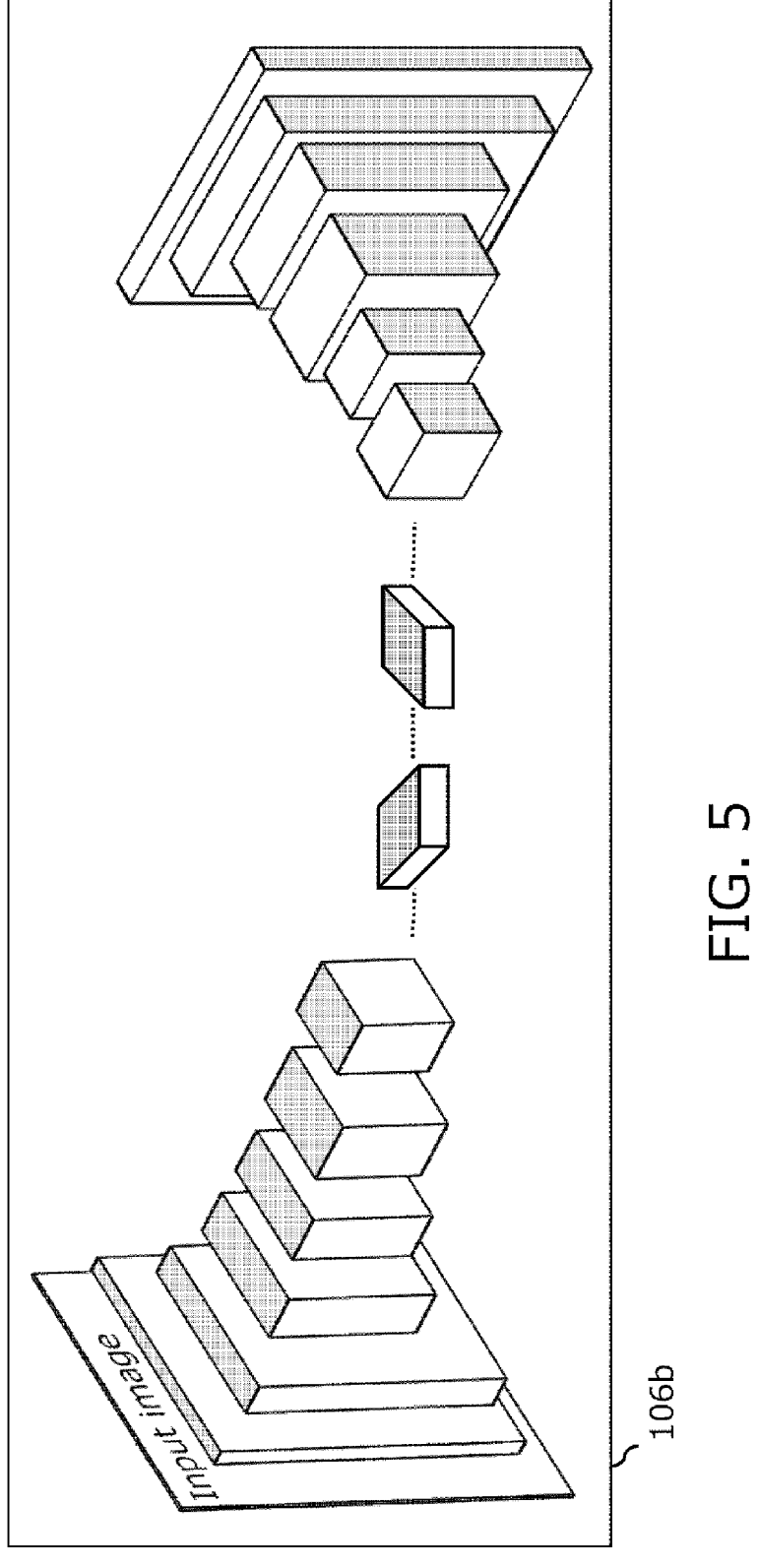
FIG. 5 is a figure showing architecture of a special type of convolutional neural network known as a convolutional autoencoder neural network 106b.

FIG. 2 is the figure showing the characterization mode 113. Firstly, the convolutional NN model 106 is taken as an input in the characterization mode 113. The example of a simple convolutional NN model 106*a* is shown in FIG. 4. The simple convolutional NN model 106*a* takes an image as an input and then sequentially performs multiple convolutional NN operations on the image. Examples of the convolutional NN operations include convolution, relu, batchnorm, pooling, etc. In the simple convolutional NN model 106*a*, the size of the intermediate layers constantly varies, depending upon the operation parameter such as the stride size, the kernel size, the number of output channels as shown in FIG. 4. The tabular representation of the convolutional NN model 106*a* of FIG. 4 is shown in FIG. 6. In the table shown in FIG. 6, the column named as Layer no. C101 indicates a sequential index of each layer. Layer type C102 indicates the type of the operation performed in respective layer. The columns named as Input Height C103, Input Width C104 and Input Channel C105 represent the height, the width and the channel size of the respective input layers. The columns named as Output Height C106, Output Width C107 and Output Channel C108 represent the height, the width and the channel size of the respective output layers. There are many variants of convolutional NN models. One special type of such models is convolutional autoencoder (CAE) NN models 106*b* shown in FIG. 5. The convolutional autoencoder NN models 106*b* can also be input to the embodiment system 100. Generally, in the convolutional autoencoder NN models 106*b*, the output image size is equal to or close to the input image size. As compared to the simple convolutional NN model 106*a*, the convolutional autoencoder NN model 106*b* uses a few additional convolutional NN operations such as upsampling, deconvolution, etc. The tabular representation of the example convolutional autoencoder NN model 106*b* is shown in FIG. 7.

Figure 19:
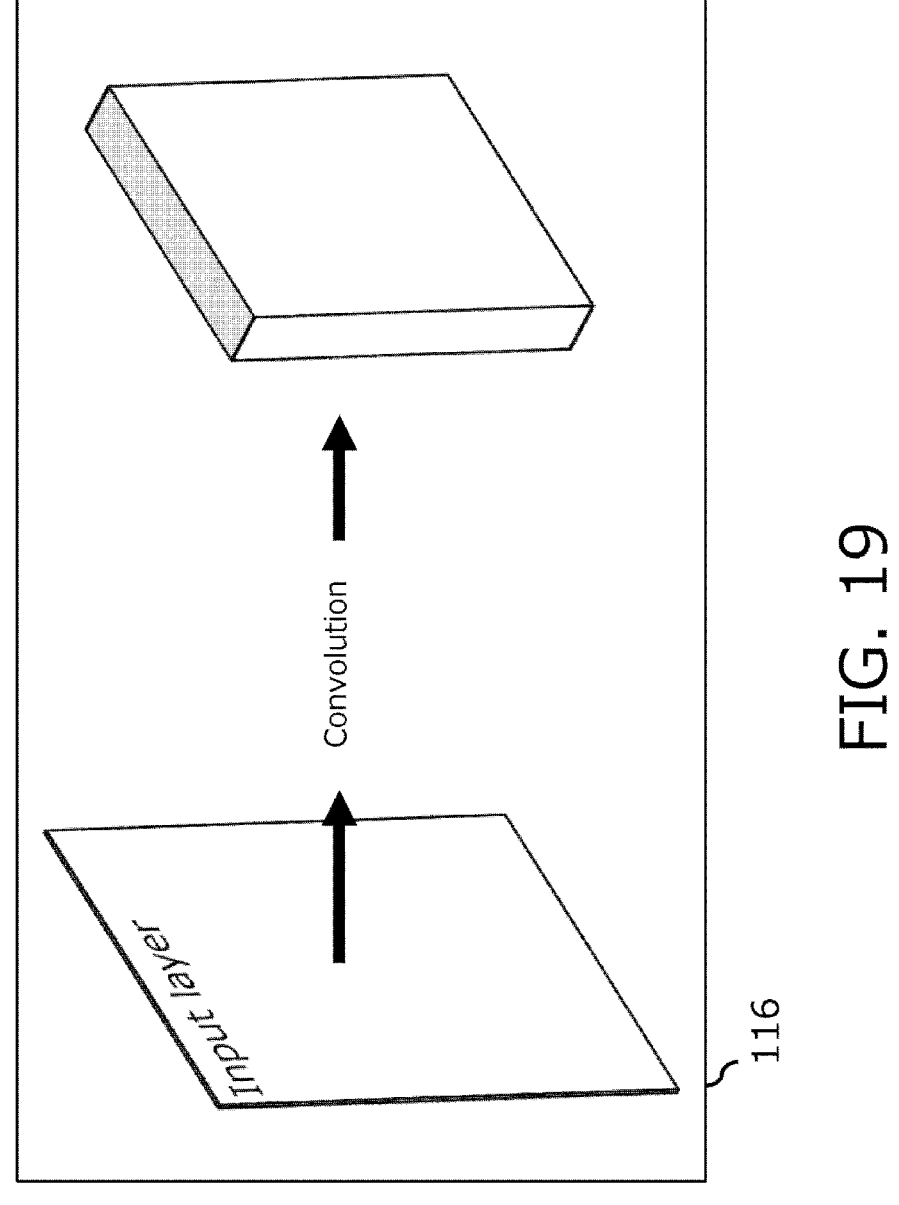
FIG. 19 is an example of a single layer model performing convolution operation.

The blackbox hardware characterizer unit 101 takes the convolutional NN model 106 as an input in the characterization mode 113. The flowchart of the blackbox hardware characterizer unit 101 is shown in FIG. 13. Initially, in a step S002, the blackbox hardware characterizer unit 101 parses the convolutional NN model 106. All the convolutional NN operations such as convolution, relu, upsampling, deconvolution, etc., which are also called here as OOI (operations of interest), are listed in FIG. 14. Along with the OOI, the corresponding input layer size and output layer size are also parsed in the step S002. Then, the blackbox hardware characterizer unit 101 selects the 1$^{st}$ operation from the OOI in a step S003 and also selects one axis 'A' of {height, width, and channel} in a step S004. Then, the blackbox hardware characterizer unit 101 auto-generates many single layer models that perform the selected operation on the input layer in a step S005. FIG. 19 shows an example of a single layer model 116 that performs a single convolution operation on the input layer. All the single layer models 116 would have a variable 'A' size that ranges from the minimum feasible value to the actual 'A' size in the input convolutional NN model 106. The other two axes will have same sizes as that of the axis 'A' in the input convolutional NN model 106. All of the single layer models 116 are then executed one after the other on the blackbox hardware unit 108 using the model optimizer+deployment tool 107 supplied by the vendor. In a step S006, the inference time of all single layer models 116 on blackbox hardware unit 108 is fed back to the blackbox hardware characterizer unit 101. In some cases, the inference time is calculated by the model optimizer+deployment unit 107. In such a case, the inference time output from the model optimizer+deployment unit 107 will be taken as feedback. In the step S006, the inference time is stored along with the respective operation name, the 'A' axis name and the 'A' axis value in a database called the characterization database 103 shown in FIG. 14. Thereafter, in a step S007, the next axis 'A' of {height, width, and channel} is selected and similar processes of generating of single layer models, executing of single layer models and storing the respective inference time, the operation name, the axis name and the axis value are repeated. Once all the axes are covered or selected for the 1$^{st}$ operation, in a step S008, the next operation is selected. Again the processes of generating of single layer models, executing of single layer models and storing the inference time, the operation name, the axis name and the axis value are repeated for all the axes. Such characterization operations are performed for all the OOI. Here, some operations would be repeated in the convolutional NN model 106 but would have different input sizes. Sometimes, there could be a repeated operation in the input convolutional NN model 106. For example, there could be multiple convolution operations in the input convolutional NN models 106. For such a case, in the repeated operation, if all the input axis sizes are smaller than same operation's input axis sizes executed earlier, then such repeated operation(s) is (are) skipped. If any of the input axis(s) size is(are) larger, then processes of the generating of single layer models, executing of single layer models and storing the inference time, the operation name, the axis name and the axis value are repeated for the respective axis. However, instead of starting from the minimum axis size, the iteration may be started from the maximum axis size used in the attempt in the earlier iteration for the same operation. After covering or selecting all the OOI, the blackbox hardware characterizer unit 101 outputs the generated database called the characterization database 103 in a step S009.

An example of a sample of the generated characterization database 103 is shown in FIG. 14. The characterization database 103 has four columns: OOI, Axis, Axis size, and Inference time (seconds). The 1$^{st}$ column C201 represents the type of the operation performed on the input layer. The 2$^{nd}$ and 3$^{rd}$ columns C202 and C203 represent the axis name and the corresponding axis size of the input layer. The 4$^{th}$ column C204 represents the inference time required by the blackbox hardware unit 108 to execute an operation on the input layer. The number of entries in the characterization database 103 will be equal to the product of the number of the operations in the OOI, the number of axes (i.e. three) and the number of varying axis sizes for the respective axes. The characterization database 103 is one of two output databases generated in the characterization mode 113.

The characterization database 103 is input to the threshold size extractor unit 109. The flowchart of the threshold size extractor unit 109 is shown in FIG. 15. Initially, in a step S010, the threshold size extractor unit 109 partitions the characterization database 103 into unique operation based mini databases e.g. a convolution database, a relu database, etc. In a step S011, the threshold size extractor unit 109 further partitions each mini database into axis based micro databases e.g. a convolution-height database, a convolution-width database, a convolution-channel database, etc. Each of the micro databases has a unique operation-axis pair. Then, in a step S012, the threshold size extractor unit 109 sorts all the micro databases in the ascending order of the axis-size. However, as the single layer models 116 are already executed in the increased axis-size, the sorting step S012 is usually skipped. Next, in a step S013, the slope (Δinference time/Δaxis-size i.e. a ratio of the difference of the inference time to the difference of the axis-size) is calculated between all the successive entries in all the micro databases. The Δaxis-size of all the successive entries are the same as one another (in this case is 1), so only the calculation of Δinference time needs to be performed. For N entries in a micro database, there would be N−1 axis-size pairs. The threshold size extractor unit 109 then searches for the highest slope in the micro database. From the axis-size pair having the highest slope, in a step S014, a bigger axis-size in the axis-size pair is determined, which will be referred to as a threshold size hereinafter. Such a threshold size is determined for each of all the micro databases. In a step S015, all threshold sizes along with the corresponding the operation name and the axis name are stored in another database called a threshold size database 104.

An example of a sample of the threshold size database 104 is shown in FIG. 16. The 1$^{st}$ column C201 represents the type of operation, the 2$^{nd}$ column C202 represents the axis name and the 3$^{rd}$ column C205 represents the threshold size for the operation-axis pair. The number of entries in the threshold size database 104 will be equal to the product of the number of unique operations in the OOI and the number of axes (i.e. three). The threshold size database 104 is one of the two output databases generated in the characterization mode 113. It should be noted that no internal information of the blackbox hardware 108 is used. Further, no information regarding the internal functionality of the model optimizer+deployment tool 107 is used. Hence, the blackbox hardware unit 108 and the model optimizer+deployment tool 107 are treated as blackboxes.

Second, FIG. 3 is the figure showing the model modification mode 114. In the model modification mode 114, the tiling optimization unit 102 takes the input convolutional NN model 106, the characterization database 103 and the threshold size database 104 as inputs. The model modification mode 114 generates the modified convolutional NN model 105 and the Model optimizer+Deployment tool 107 deploys the modified convolutional NN model 105 on the blackbox hardware unit 108. In the model modification mode 114, the tiling optimization unit 102, the model optimizer+deployment tool unit 107 and the blackbox hardware unit 108 operate.

Figure 12:
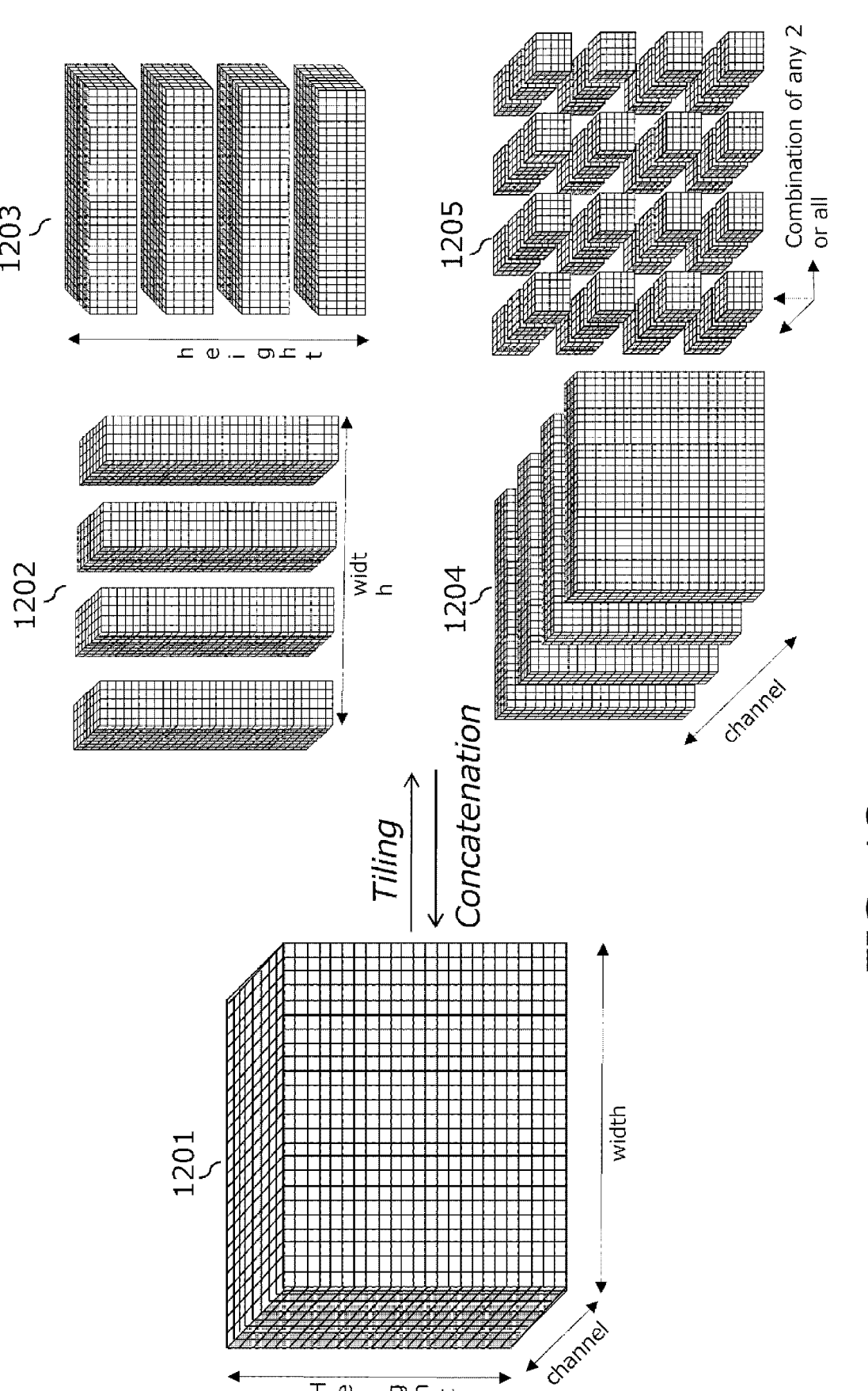
FIG. 12 is an example of the tiling operation and concatenation operation performed on a layer along the width, height, channel, a combination of any two or all of them with some number of tiles.
Figure 17:
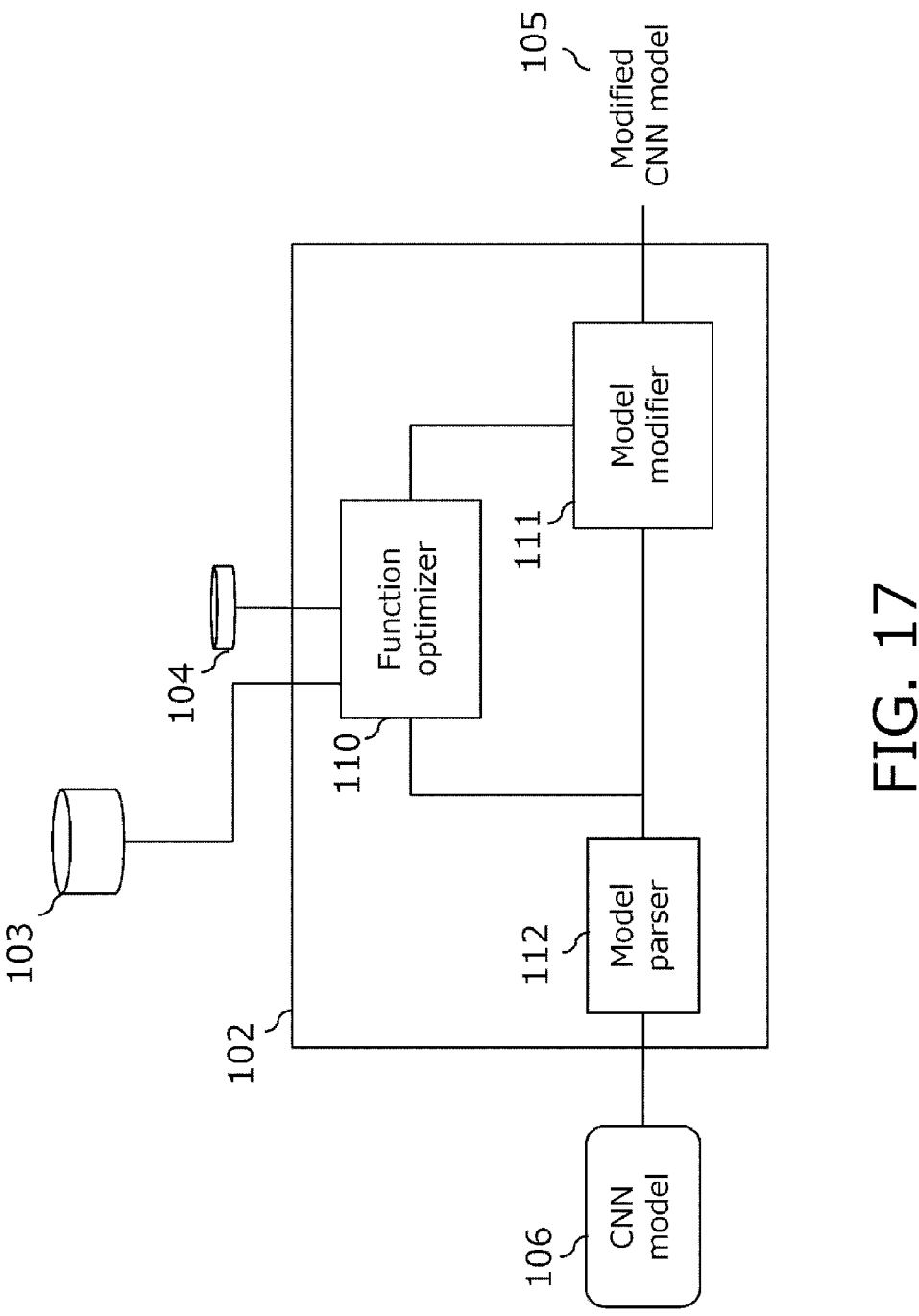
FIG. 17 is a figure showing the Tiling optimization unit 102, which modifies the input convolutional NN model 106 to a modified convolutional NN model 105 that has better performance on the blackbox hardware unit 108.

The Tiling optimization unit 102 takes the input convolutional NN model 106, the characterization database 103 and the threshold size database 104 as inputs. The internal block diagram of the Tiling optimization unit 102 is shown in the FIG. 17. The function of the tiling optimization unit 102 is to modify the input convolutional NN model 106 by introducing tiling operations and concatenation operations at various layers in the input convolutional NN model 106. The input convolutional NN model 106 with additional tiling operations and concatenation operations is referred to as the modified convolutional NN model 105. Tiling operations on a layer 1201 splits the layer into multiple small tiles 1202 1203 1204 and 1205 as shown in FIG. 12. The tiling operation can be performed along an axis or the combination of two or all axes shown in FIG. 12. The tiling operation is a memory operation. The execution time required for performing the tiling operation generally depends on the number of tiles formed from the input layer and also depends upon the size of the input layer. The concatenation operation is functionally exactly opposite to the tiling operation. In the concatenation operation, an input layer has multiple tiles 1202 1203 1204 and 1205 and is concatenated to generate the single tile layer 1201 as shown in FIG. 12.

The tiling optimization unit 102 comprises three blocks: a Model parser 112, a Function optimizer 110 and a Model modifier 111. The model parser block 112 takes the convolutional NN model 106 as an input. The model parser block 112 performs the tasks of parsing the model in the same manner as the FIGS. 6a and 6b. The functionality of the model parser block 112 is same as that of the parser used in the step S002 by the blackbox hardware characterizer unit 101. Hence the model parser block 112 and the parser used in the step S002 by the blackbox hardware characterizer unit 101 may also be shared. The model information by the model parser block 112 is given as an input to the Function optimizer unit 110 and the model modifier unit 111.

The Function optimizer unit 110 acquires the model information from the model parser block 112, the threshold size database 104 from the threshold size extractor unit 109 and the characterization database 103 from the blackbox hardware characterizer unit 101. The Function optimizer unit 110 performs the optimization for the determining of the best range of the layers in the input convolutional NN model 106 in which the tiling operations and the concatenation operations are introduced. The input convolutional NN model 106 with additional tiling operations and concatenation operations is referred to as the modified convolutional NN model 105. The modified convolutional NN model 105 has better performance on the blackbox hardware unit 108 as compared to the input convolutional NN model 106 on the blackbox hardware unit 108. The Function optimizer unit 110 performs the optimization for the determining of the best range of the layers in four steps. In the first step, the minimum number of tiles along all the axes for all individual layers in the input convolutional NN model 106 is calculated. The minimum number of tiles along an axis for the layer means the smallest number of small tiles that should be formed after the introduction of the tiling operation at the respective layer of the input convolutional NN model 106. After the introduction of tiling operations and the concatenation operations, each layer in the input convolutional NN model 106 will definitely have the number of small tiles greater than or equal to the respective minimum number of tiles along the respective axis. In the second step, the tiling execution time database 117 is generated as shown in FIG. 23. In the third step, the concatenation execution time database 118 is generated as shown in FIG. 23. Lastly, in the fourth step, by using the minimum number of tiles, the characterization database 103 along with the tiling execution time database 117 and the concatenation execution time database 118, an objective function F(L) is solved. The function F(L) outputs the range of layers in the convolutional NN model 106, in which tiling operations and the concatenation operations are introduced to generate the modified convolutional NN model 105.

Initially, in the first step, the Functional optimizer unit 110 creates three lists containing the minimum number of tiles along all of the three axes for all individual layers in the input convolutional NN model 106. As there are three axes i.e. the height, width and channel, three separate lists will be created and called a $tile_{height}$ list, a $tile_{width}$ list and a $tile_{channel}$ list respectively. For calculating the minimum number of tiles for a layer along the height axis, the Functional optimizer unit 110 determines the type of operation in the layer from the model parser block 112 and the input layer's height. The Functional optimizer unit 110 then acquires the threshold size along the height for the respective operation from the Threshold size database 104. Lastly, the Functional optimizer unit 110 calculates the ratio of the input layer's height to the threshold size along the height. If the resulting ratio is an integer and is not already present in the $tile_{height}$ list, then the resulting ratio is added in the $tile_{height}$ list. If the resulting ratio is a decimal fraction, then the resulting ratio is rounded to the nearest bigger integer. Then, if the rounded ratio is not present in the $tile_{height}$ list, the rounded resulting ratio is added in the $tile_{height}$ list. Similarly, the minimum numbers of tiles along the width and channel are also calculated and the $tile_{width}$ and the $tile_{channel}$ lists are created. For example, the minimum number of tiles for the height axis of the layer 1 having the convolution operation in the simple convolutional NN model 106a will be the ratio of the input height 1980 from FIG. 6 to convolution operation's threshold size along the height 992 from FIG. 16. After rounding the ratio to the nearest bigger integer, the rounded ratio will be two. Examples of such minimum numbers of tiles of the simple convolutional NN model 106a and the convolutional autoencoder NN model 106b are shown in FIGS. 20 and 21. FIG. 22 shows the list of minimum numbers of tiles along the height, width and channel in the $tile_{height}$ list, $tile_{width}$ list and $tile_{channel}$ list respectively.

In the second step, the tiling operation along an axis on all individual layers in the input convolutional NN model 106 is performed and evaluated on the blackbox hardware unit 108 to create a new database called a tiling execution time database 117. For creating the tiling execution time database 117, initially the single layer models having the input layer size equal to the size of the 1$^{st}$ layer in the input convolutional NN model 106 is evaluated on the black box hardware unit 108, and the execution time in addition to the axis name, the input size and the number of the tiles are stored in the database called a tiling execution time database 117. The tiling operation is performed along a height such that the number of formed tiles is equal to the first value in the $tile_{height}$ list. Similar evaluation of the single layer model having an input layer size equal to the size of the 1$^{st}$ layer in the input convolutional NN model 106 and the tiling operation are carried out for the remaining values in the $tile_{height}$ list of the FIG. 22. So, now the number of entries in the tiling execution time database 117 is equal to the number of entries in the $tile_{height}$ list. Such characterization is done then for other two axes i.e. the width and channel. For the characterization along the width and channel axes, the numbers of tiles are selected from the $tile_{width}$ and $tile_{channel}$ lists respectively shown in FIG. 22. The database generated by such characterization of the tiling operation on all the layers in the input convolutional NN model is called a tiling execution time database 117. The number of tiles along all axes from the tile$_{height}$ list, tile$_{width}$ list and tile$_{channel}$ list respectively are varied.

In the third step, the Functional optimization unit 110 performs characterization of the concatenation operation to generate the concatenation execution time database 118. The concatenation operation is functionally exactly opposite to the tiling operation. All the varying sizes and the varying number of tiles generated as the output of the tiling operation during the characterization of the tiling operation in the $2^{nd}$ step will be input layers in the concatenation operation characterization. The output of the concatenation operation on such multiple tile layers will be equal to the respective input layer used in a tiling operation characterization. The concatenation operation is a memory operation. The database generated by the characterization of the concatenation operation is called the concatenation execution time database 118. The sizes of the concatenation execution time database 118 and the tiling execution time database 117 are equal to each other.

Lastly, in the fourth step, the Functional optimizer unit 110 solves the Objective function F(L) shown in FIG. 18. The Functional optimizer unit 110 uses the tiling execution time database 117, the concatenation execution time database 118, the characterization database 103 and the minimum number of tiles to solve the equation. Solving the objective function F(L) gives a range of L layers in which the tiling operation or the concatenation operation is introduced such that the modified model obtained after introducing additional tiling or concatenation operation in the input convolutional NN model 106 have better performance on the blackbox hardware unit 108. The Objective function F(L) minimizes the total execution time of the input convolutional NN model 106 on the blackbox hardware 108. The total execution time is equal to the sum of the execution time of each layers (Exec$_i$) in the input convolutional NN model 106, and the overhead time to execute additional tiling or concatenation operation along the height (Overhead$_{i,height}$), width (Overhead$_{i,width}$) and channel (Overhead$_{i,channel}$) axis at each layer if any. The execution time of the layer (Exec$_i$) is equal to the total execution time of all the tiles in the layer. All the combinations of the introduced tiling and concatenation operations along all the axes for all layer in the input convolutional NN model are exhaustively evaluated. One of the combinations will have the minimum total execution time and is selected as a final result. The tiling operation along the height introduced in any layer is performed in such a manner that the number of tiles formed along the height is equal to one of the entries in the tile$_{height}$ list. This applies to the operations for the width and channel axis, too. As the tile$_{height}$ list, the tile$_{width}$ list and the tile$_{channel}$ list have the limited numbers of entries, the number of exhaustive combinations to be evaluated is very small compared to the number of exhaustive combinations for introducing the tiling operations and the concatenation operations in various layers along all the axes for all the different number of tiles. Hence, by solving the objective function F(L), the information such as the range of L layers in which the tiling and concatenation operation are introduced, the operation type at each layer i.e. the introduced tiling or concatenation operation, if introduced, the axis name along which the tiling or concatenation operation is introduced and the number of tiles formed by the tiling or the number of tiles concatenated by the concatenation operation in each layer is given as an output by the Functional optimizer unit 110.

Using such information from the Functional optimizer unit 110 and the parse information of the model from the Model parser 112, the Model modifier unit 111 creates the Modified convolutional NN model 105. The Modified convolutional NN model 105 is similar to the input convolutional NN model 106 with additional the tiling and concatenation operations introduced in various layers. The Modified convolutional NN model 105 is the final output of the tiling optimization unit 102.

Figure 8:
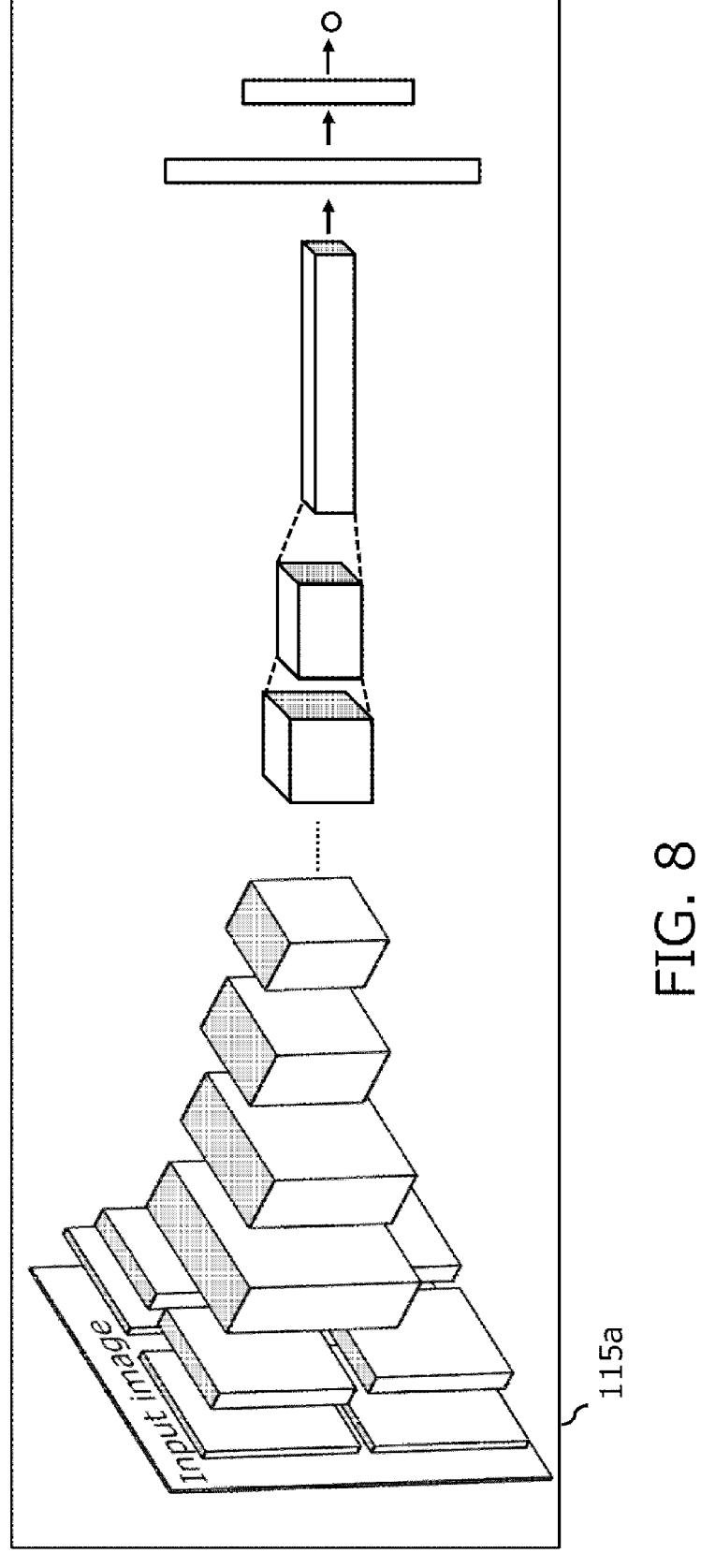
Figure 10:
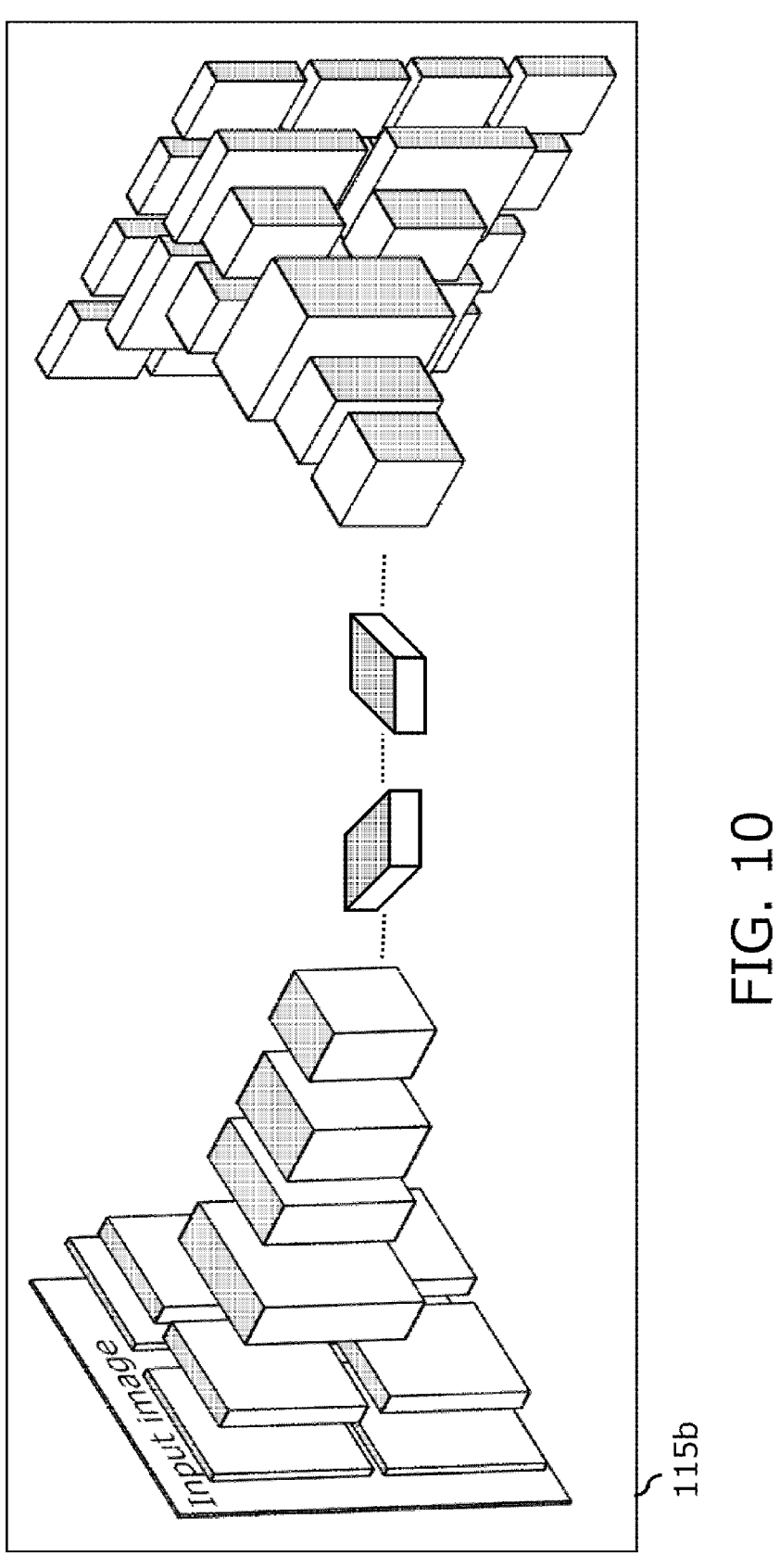
FIG. 10 is a figure showing the modified convolutional autoencoder NN model 106b.

The simple convolutional NN model 106a and convolutional autoencoder NN model 106b having some or all layers, where the tiling and concatenation operations are introduced, are referred to as a modified simple convolutional NN model 115a and a modified convolutional autoencoder NN model 115b, respectively. An example of the modified simple convolutional NN model 115a is shown in FIG. 8 which is obtained by introducing the additional tiling operations and concatenation operations on some layers of the simple convolutional NN model 106a in FIG. 4. The layer wise depiction of the modified simple convolutional NN model 115a is shown in FIG. 9. In the $1^{st}$ layer of the simple convolutional NN model 106a, the tiling operations along the height and width are introduced as shown in FIG. 8. The concatenation operation is introduced in the $2^{nd}$ layer. The $1^{st}$ layer in the simple convolutional NN model 106a is tiled with four tiles. The size along all the axes of all four tiles of the $1^{st}$ layer is shown in FIG. 9. An example of the convolutional tiled autoencoder NN model 115b is shown in FIG. 10 which is obtained by introducing the additional tiling operations on some layers of the convolutional autoencoder NN model 106b in FIG. 5. The layer wise depiction of the modified convolutional autoencoder NN model 115b is shown in FIG. 11. The layer numbers N−1 and N of the convolutional autoencoder NN model 106b, where the tiling operations are introduced along the height and width as shown in FIG. 8, are shown in FIG. 11. The N−$1^{th}$ layer of the convolutional autoencoder NN model 106b is tiled with four tiles. Similarly, the N$^{th}$ layer is also tiled with 16 tiles. The sizes along all the axis of N$^{th}$ layers are shown in FIG. 11.

The modified convolutional NN model 105 is fed to the model optimizer+deployment tool 107. The model optimizer+deployment tool 107 performs the compilation of the modified convolutional NN model 105 and deploys it on the blackbox hardware unit 108. The model optimizer+deployment tool 107 is generally provided by a hardware vendor. The detailed internal functionality of the model optimizer+deployment tool 107 is not revealed by the vendor. Therefore, the model optimizer+deployment tool 107 is a blackbox to the user. Hence, the detailed explanation of the model optimizer+deployment tool 107 is beyond the scope of the embodiment.

Description of Effect

Next, the effect of the present example embodiment is described.

A first effect is to ensure that big layers are efficiently tiled such that they are effectively executed even on the blackbox hardware.

The reason for the effect is that the embodiment system performs blackbox characterization and identifies the threshold sizes on the layer axis for all operation layers in the convolutional NN model 106.

A second effect is to ensure that the tiling operation time overhead for the big layers will be eliminated or reduced.

The present example embodiment is configured to characterize the target hardware treating as the blackbox and obtains the threshold size of all the operation layer in the input convolutional NN model. Then, the optimization is performed to determine the range of layers in the convolutional NN model where the tiling operations and concatenation operations are introduced. By such optimization, it is possible to transform big layer such that they are efficiently executed by the hardware. In addition, the example embodiment is configured in such a manner that the tiling of the small layers is possible, thus making it possible to avoid the tiling of big layers and the corresponding tiling operation overhead during the execution. Further, the example embodiment is configured in such a manner that the tiling operation overhead and concatenation operation overhead is also taken into consideration when determining the range of L layers, where the tiling operations and concatenation operations are added. By such optimization, it is possible to modify the input convolutional NN model such that the modified convolutional NN model with additional tiling operations and concatenation operations has improved performance and reduce inference time with zero accuracy degradation.

Further, the present disclosure can provide a system that performs hardware optimization on the convolutional NN by performing the characterization of the blackbox hardware 108 and then performing the tiling based model optimization to reduce the inference time with zero accuracy degradation.

Figure 25:
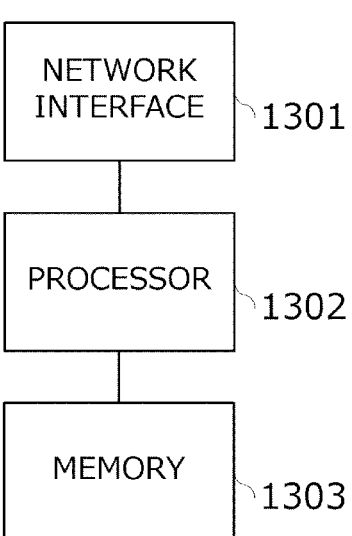
FIG. 25 is a block diagram of a computer device.

Configuration examples of the computer devices 20 and 21 described in the above plurality of example embodiments are described hereinafter with reference to FIG. 25. FIG. 25 is a block diagram showing configuration examples of the computer devices 20 and 21. Referring to FIG. 25, computer devices 20 and 21 include a network interface 1301, a processor 1302, and a memory 1303. The network interface 1301 is used to communicate with another network node that constitutes the communication system. The network interface 1301 may include a network interface card (NIC) that complies with the IEEE 802.3 series, for example.

The processor 1302 reads and runs software (computer program) from the memory 1303 and thereby executes processing of the computer devices 20 and 21 that are described with reference to the sequence charts and the flowcharts in the example embodiments described above. The processor 1302 may be a microprocessor, an MPU (Micro Processing Unit) or a CPU (Central Processing Unit), for example. The processor 1302 may include a plurality of processors.

The memory 1303 is a combination of a volatile memory and a nonvolatile memory. The memory 1303 may include a storage that is placed apart from the processor 1302. In this case, the processor 1302 may access the memory 1303 through an I/O interface, which is not shown.

In the example of FIG. 25, the memory 1303 is used to store a group of software modules. The processor 1302 performs the processing of the computer devices 20 and 21 described in the above example embodiments by reading the group of software modules from the memory 1303 and executing it.

As described with reference to FIG. 25, each of processors included in the computer devices 20 and 21 runs one or a plurality of programs including a group of instructions for causing a computer to perform the algorithms described using the drawings.

In the above-described example, the program can be stored and provided to the computer using any type of non-transitory computer readable medium. The non-transitory computer readable medium includes any type of tangible storage medium. Examples of the non-transitory computer readable medium include magnetic storage media (such as floppy disks, magnetic tapes, hard disk drives, etc.), optical magnetic storage media (e.g. magneto-optical disks), CD-ROM (Read Only Memory), CD-R, CD-R/W, DVD-ROM (Digital Versatile Disc Read Only Memory), DVD-R (DVD Recordable), DVD-R DL (DVD-R Dual Layer), DVD-RW (DVD ReWritable), DVD-RAM, DVD+R, DVR+R DL, DVD+RW, BD-R (Blu-ray (registered trademark) Disc Recordable), BD-RE (Blu-ray (registered trademark) Disc Rewritable), BD-ROM, and semiconductor memories (such as mask ROM, PROM (Programmable ROM), EPROM (Erasable PROM), flash ROM, RAM (Random Access Memory), etc.). The program may be provided to a computer using any type of transitory computer readable medium. Examples of the transitory computer readable medium include electric signals, optical signals, and electromagnetic waves. The transitory computer readable medium can provide the program to a computer via a wired communication line such as an electric wire or optical fiber or a wireless communication line.

It should be noted that the present invention is not limited to the above-described example embodiments and may be varied in many ways within the scope of the present invention. Further, in this disclosure, example embodiments can be combined as appropriate.

While the invention has been particularly shown and described with reference to example embodiments thereof, the invention is not limited to these example embodiments. It will be understood by those of ordinary skill in the art that various changes in form and details may be made therein without departing from the spirit and scope of the present invention as defined by the claims.

REFERENCE SIGNS LIST

11 Performing unit
12 Managing unit
13 Determining unit
14 Generating unit
100 Tiling based convolutional NN model optimizing system for blackbox hardware
101 Blackbox hardware characterizer unit
102 Tiling optimization unit
103 Characterization database
104 Threshold size database
105 Modified convolutional NN model
106 convolutional NN model
106a Simple convolutional NN model
106b Convolutional Autoencoder NN model
107 Model optimizer+deployment tool unit
108 Blackbox Hardware
109 Threshold size extractor unit
110 Function optimizer
111 Model modifier
112 Model parser
113 Characterization mode
114 Model modification mode
115a Tiled simple convolutional NN model
115b Tiled convolutional autoencoder NN model
116 Single layer model
117 Tiling execution time database
118 Concatenation execution time database

1201 A Convolutional NN layer
1202 Tiled Convolutional NN layer along height axis
1203 Tiled Convolutional NN layer along width axis
1204 Tiled Convolutional NN layer along channel axis
1205 Tiled Convolutional NN layer along combination of 2 or all axis
1301 Network Interface
1302 Processor
1303 Memory

What is claimed is:

1. A system comprising:
at least one memory storing instructions; and
at least one processor configured to execute the instructions to:
    perform a plurality of test inference runs by repeatedly changing a size of input data for a first convolutional neural network (NN) model and executing a convolutional NN model operation included in the first convolutional NN model on the input data on a blackbox device, wherein internal hardware information of the blackbox device is unknown, to obtain a plurality of measured inference time values corresponding to a plurality of sizes of the input data;
    determine, for each operation-axis pair, a threshold size based on a ratio of a change in the measured inference time values to a change in the size of the input data obtained from the plurality of test inference runs;
    determine, based on the determined threshold size, one or more layer positions within the first convolutional NN model at which at least one of a tiling operation and a concatenation operation is to be added;
    generate a second convolutional NN model by adding the at least one of the tiling operation and the concatenation operation to the first convolutional NN model at the determined one or more layer positions; and
    perform an inference operation using the second convolutional NN model on the blackbox device.

2. The system according to claim 1, wherein the at least one processor is further configured to execute the instructions to execute the convolutional NN model operation by changing at least one of a height, a width, and a channel of the input data, and manage at least one of the height, the width, and the channel of the input data in association with the measured inference time values.

3. The system according to claim 1, wherein the at least one processor is further configured to execute the instructions to determine layer positions at which the tiling operation and the concatenation operation are performed based on an amount of a change in the measured inference time values and an amount of a change in the size of the input data.

4. The system according to claim 1, wherein the at least one processor is further configured to execute the instructions to determine layer positions at which the tiling operation and the concatenation operation are performed to reduce the measured inference time values in a case where all convolutional NN operations included in the first convolutional NN model are performed.

5. A method comprising:
performing a plurality of test inference runs by repeatedly changing a size of input data for a first convolutional neural network (NN) model and executing a convolutional NN model operation included in the first convolutional NN model on the input data on a blackbox device, wherein internal hardware information of the blackbox device is unknown, to obtain a plurality of measured inference time values corresponding to a plurality of sizes of the input data;
determining, for each operation-axis pair, a threshold size based on a ratio of a change in the measured inference time values to a change in the size of the input data obtained from the plurality of test inference runs;
determining, based on the determined threshold size, one or more layer positions within the first convolutional NN model at which at least one of a tiling operation and a concatenation operation is to be added;
generating a second convolutional NN model by adding the at least one of the tiling operation and the concatenation operation to the first convolutional NN model at the determined one or more layer positions; and
performing an inference operation using the second convolutional NN model on the blackbox device.

6. A non-transitory computer readable medium storing a program for causing a computer to execute:
performing a plurality of test inference runs by repeatedly changing a size of input data for a first convolutional neural network (NN) model and executing a convolutional NN model operation included in the first convolutional NN model on the input data on a blackbox device, wherein internal hardware information of the blackbox device is unknown, to obtain a plurality of measured inference time values corresponding to a plurality of sizes of the input data;
determining, for each operation-axis pair, a threshold size based on a ratio of a change in the measured inference time values to a change in the size of the input data obtained from the plurality of test inference runs;
determining, based on the determined threshold size, one or more layer positions within the first convolutional NN model at which at least one of a tiling operation and a concatenation operation is to be added;
generating a second convolutional NN model by adding the at least one of the tiling operation and the concatenation operation to the first convolutional NN model at the determined one or more layer positions; and
performing an inference operation using the second convolutional NN model on the blackbox device.

* * * * *